(12) United States Patent
Campus et al.

(10) Patent No.: US 11,581,741 B2
(45) Date of Patent: Feb. 14, 2023

(54) DESIGN, DEPLOYMENT, AND OPERATION OF MODULAR MICROGRID WITH INTELLIGENT ENERGY MANAGEMENT

(71) Applicant: BoxPower Inc., Grass Valley, CA (US)

(72) Inventors: Angelo V. Campus, Nevada City, CA (US); Michele Nesbit, Nevada City, CA (US); Gary Campus, Nevada City, CA (US); Jim Crawford, Grass Valley, CA (US); Brian Bookout, Grass Valley, CA (US); Alexander Asante, Grass Valley, CA (US)

(73) Assignee: BoxPower Inc., Grass Valley, CA (US)

( * ) Notice: Subject to any disclaimer, the term of this patent is extended or adjusted under 35 U.S.C. 154(b) by 294 days.

(21) Appl. No.: 16/676,282

(22) Filed: Nov. 6, 2019

(65) Prior Publication Data
US 2020/0144824 A1 May 7, 2020

Related U.S. Application Data

(60) Provisional application No. 62/756,200, filed on Nov. 6, 2018.

(51) Int. Cl.
*H02J 3/38* (2006.01)
*H02J 3/32* (2006.01)
(Continued)

(52) U.S. Cl.
CPC ............ *H02J 3/383* (2013.01); *G05B 19/042* (2013.01); *H02J 3/32* (2013.01); *H02J 13/0017* (2013.01);
(Continued)

(58) Field of Classification Search
CPC .......... H02J 3/383; H02J 3/32; H02J 13/0017; H02J 3/003; H02J 3/004; H02J 3/144;
(Continued)

(56) References Cited

U.S. PATENT DOCUMENTS 7,230,819 B2 6/2007 Muchow et al.
8,295,033 B2 10/2012 Van Straten
(Continued)

FOREIGN PATENT DOCUMENTS

WO 2014071314 A2 5/2014

OTHER PUBLICATIONS

International Search Report and Written Opinion dated Feb. 27, 2020, for PCT Application No. PCT/US19/60145, filed Nov. 6, 2019, fourteen pages.
(Continued)

*Primary Examiner* — Charles R Kasenge
(74) *Attorney, Agent, or Firm* — Morrison & Foerster LLP

(57) ABSTRACT

A rapidly deployable modular microgrid including a plurality of renewable and other energy generation technologies, energy storage technologies, energy distribution networks, and intelligent control systems capable of managing the flow of electrical energy between one or more locations of energy generation, storage, and consumption are disclosed. The aforementioned microgrid may be delivered and rapidly deployed to provide primary or secondary electricity for a variety of purposes; including but not limited to household electrification, commercial or industrial productivity, grid resiliency, water pumping, telecommunication systems, medical facilities, and disaster relief efforts.

53 Claims, 28 Drawing Sheets

(51) Int. Cl.
　　　*H02J 13/00*　　　(2006.01)
　　　*H02S 10/10*　　　(2014.01)
　　　*G05B 19/042*　　(2006.01)

(52) U.S. Cl.
　　　CPC .... *H02S 10/10* (2014.12); *G05B 2219/23039* (2013.01)

(58) Field of Classification Search
　　　CPC ...... H02J 7/35; H02J 2203/10; H02J 2300/20; H02J 2310/10; H02J 3/381; G05B 19/042; G05B 2219/23039; G05B 2219/2639; H02S 10/10; H02S 10/40; Y02B 10/10; Y02B 70/3225; Y02B 90/20; Y02E 10/56; Y02P 80/20; Y04S 20/12; Y04S 20/222
　　　See application file for complete search history.

(56) References Cited

U.S. PATENT DOCUMENTS

| | | | |
|---|---|---|---|
| 8,654,512 | B2 | 2/2014 | Van Straten |
| 8,854,794 | B2 | 10/2014 | Van Straten |
| 2008/0122449 | A1 | 5/2008 | Besser |
| 2011/0041415 | A1* | 2/2011 | Esposito ............... E04B 1/343 52/12 |
| 2011/0080044 | A1* | 4/2011 | Schmiegel ............ H02J 3/383 307/38 |
| 2012/0090665 | A1* | 4/2012 | Zuritis .................. F16B 7/105 136/251 |
| 2013/0258730 | A1* | 10/2013 | Sato ....................... H02J 3/381 363/78 |
| 2014/0125134 | A1 | 5/2014 | Van Straten |
| 2015/0097437 | A1* | 4/2015 | Votoupal .................. H02J 3/48 307/84 |
| 2017/0013810 | A1* | 1/2017 | Grabell ................. A01K 61/80 |
| 2017/0201077 | A1 | 7/2017 | Hafner |
| 2017/0222475 | A1 | 8/2017 | Van Straten |
| 2017/0244252 | A1* | 8/2017 | Nakayama ............. H02J 3/381 |
| 2018/0226797 | A1* | 8/2018 | Galin ....................... H02J 3/14 |

OTHER PUBLICATIONS

International Preliminary Report on Patentability and Written Opinion dated May 20, 2021, for PCT Application No. PCT/US2019/060145, filed Nov. 6, 2019, seven pages.

* cited by examiner

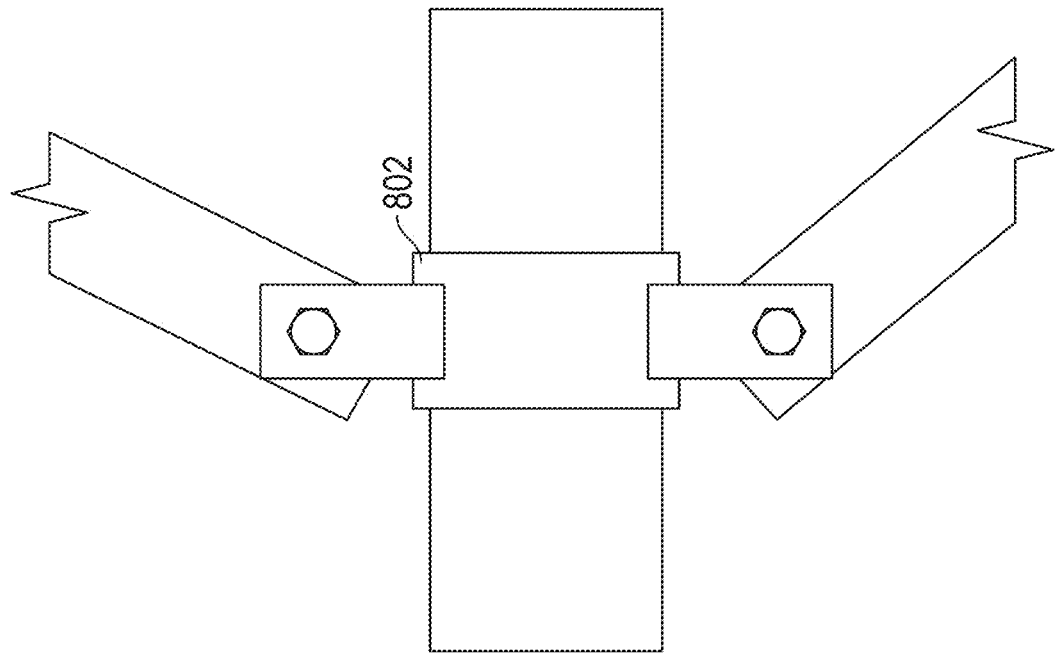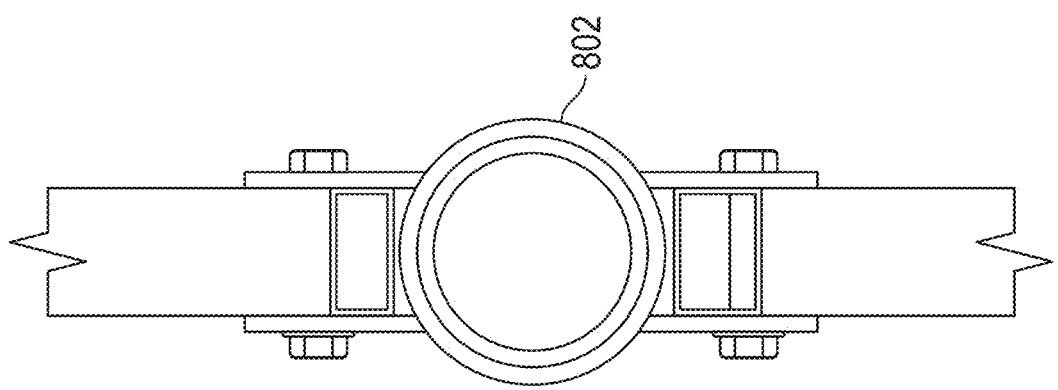
FIG. 8

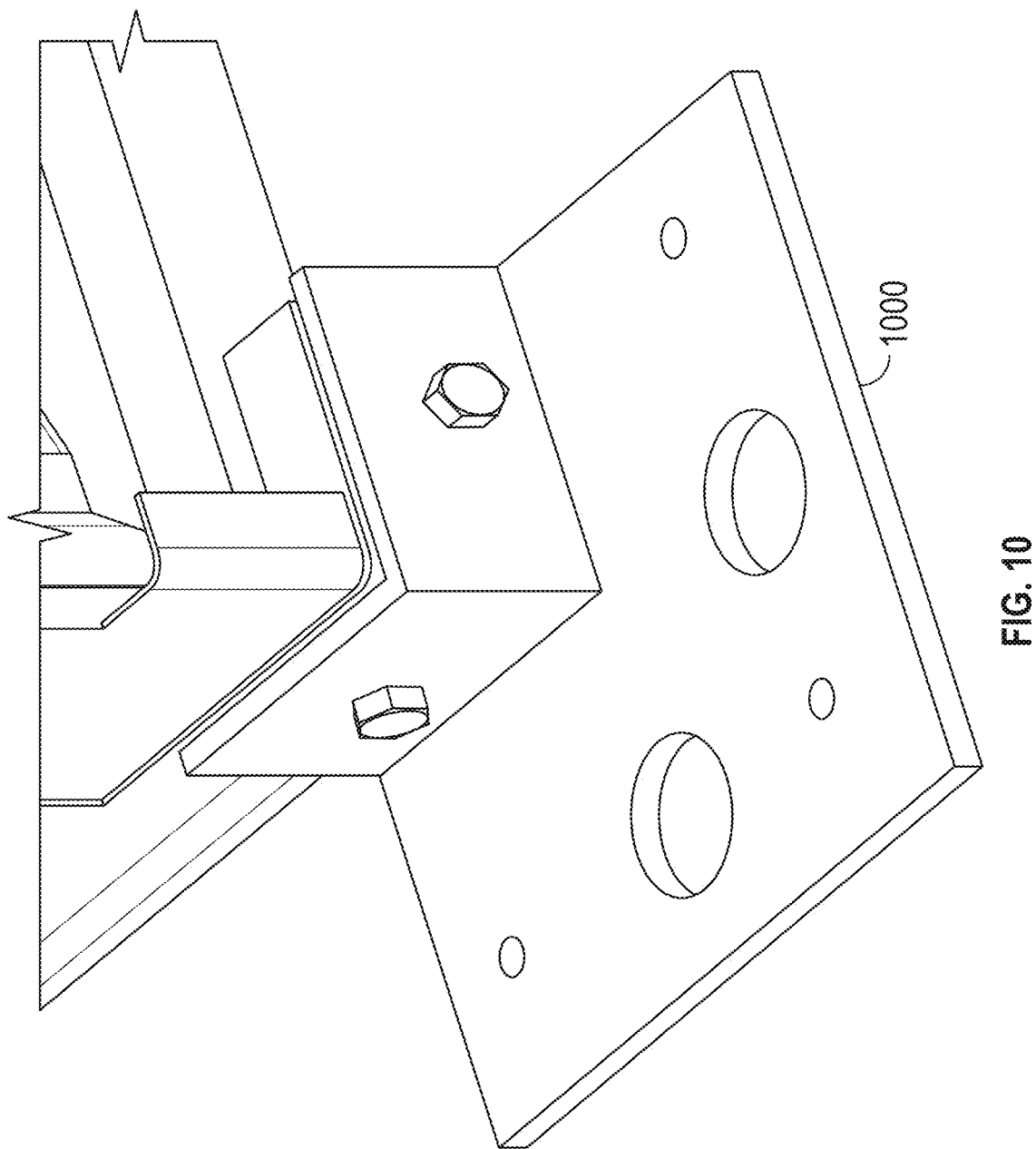

DESIGN, DEPLOYMENT, AND OPERATION OF MODULAR MICROGRID WITH INTELLIGENT ENERGY MANAGEMENT

CROSS-REFERENCE TO RELATED APPLICATIONS

This application claims benefit of U.S. Provisional Patent Application No. 62/756,200, filed Nov. 6, 2018, which is hereby incorporated by reference in its entirety.

FIELD OF THE DISCLOSURE

This disclosure relates to the design, deployment, and operation of one or more modular micro-grid systems including the generation, storage, and intelligent management of electrical energy.

BACKGROUND OF THE DISCLOSURE

Conventional methods of electrical infrastructure development have failed to provide access to electricity to a large portion of the world's population. The majority of the world's population resides in rural or remote locations, beyond the reach of traditional centralized electricity grids. The expansion of centralized grids to these remote regions has progressed slowly due to a combination of technological, political, and financial complications. On the one hand, political turnover in governments limits their ability to complete long-term development projects, particularly when the recipients reside in economically and politically neglected regions. On the other hand, private infrastructure developers have also failed to provide rural populations with electricity due to the heightened financial risks associated with rural development. Because rural populations often lack the reliable income and purchasing power of their urban counterparts, this causes private investors and developers to see them as risky markets to enter. Therefore, traditional methods of centralized electricity generation and transmission work well for high density populations with substantial per-capita electricity consumption, but fail to provide benefits to rural dispersed populations with low per capita energy consumption.

The only alternative electricity sources that have been available to these rural populations are fossil fuel powered diesel or gasoline generators. In addition to the substantial health and environmental risks associated with fossil-fuel combustion generators, volatility in fuel prices creates financial hardship and instability among communities which rely upon them. Moreover, fossil fuel combustion generators are inefficient when operated at low capacity, and must be entirely replaced if electricity demands exceed their maximum capacity. For these reasons, fossil fuel generators are an unsatisfactory energy solution for rural populations with unstable purchasing power and unpredictable electricity consumption.

In recent decades, renewable energy technologies based on wind energy and solar energy have opened new opportunities for rural electrification. Renewable energy sources are exempt from the volatility of fuel prices and are also free of the environmental and health risks associated with fossil fuel combustion. Renewable energy technologies have been widely adopted in developed nations around the world, and their prices have decreased exponentially in the last decade. Unfortunately for rural populations, these benefits have failed to reach those that could benefit from them the most. While renewable energy systems have become widely affordable and available in developed regions, a combination of distribution chain inefficiency and installation inefficiency has prevented the dissemination of renewable technologies to rural and impoverished populations. Regulatory barriers, design costs, and installation costs have remained disproportionately high for rural populations as compared to their urban counterparts.

There is therefore a need for an improvement upon both the technology and methods involved in the development and operation of electrical infrastructures in remote and underdeveloped regions. Specifically, modular systems that can facilitate the rapid deployment of energy generation technologies and storage technologies at a minimal cost to both the provider and consumer are needed.

SUMMARY OF THE DISCLOSURE

Disclosed herein are methods of constructing, deploying, and operating a modular microgrid comprising one or more modules, each of which may contain one or more technologies related to the generation, storage, control, and distribution of electrical energy. A modular microgrid can include, but is not limited to, one or more sources of renewable or nonrenewable energy generation, one or more energy storage systems, a local distribution network capable of transmitting electrical energy and a microgrid control and management system optimizing the generation, distribution, and consumption of said energy. In a first example, generation, storage, distribution, management, control, and communication technologies can be co-located and delivered in a single integrated module, capable of operating independently, or in conjunction with other similar or distinct modules.

BRIEF DESCRIPTION OF THE DRAWINGS

FIG. 8 illustrates a double coupling sleeve according to examples of the disclosure.

FIG. 10 illustrates an embodiment of a container anchoring bracket according to an example of the disclosure.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Figure 1:
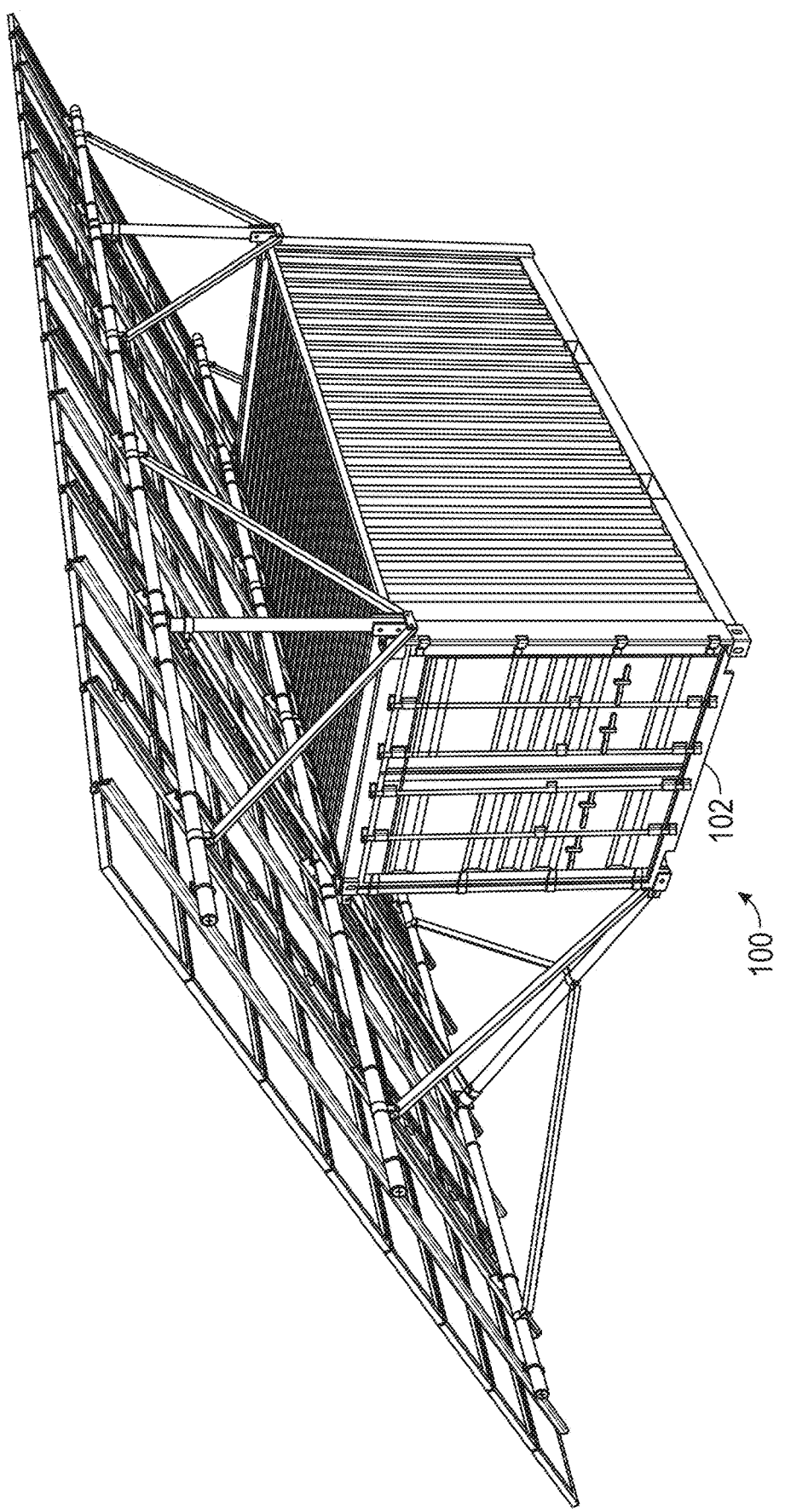
FIG. 1 illustrates a microgrid module according to an example of the disclosure.

FIG. 1 illustrates an embodiment of a microgrid module according to an example of the disclosure. In some embodiments, the microgrid module 100 may include a container 102, which may be a standard CONEX shipping container.

Figure 2:
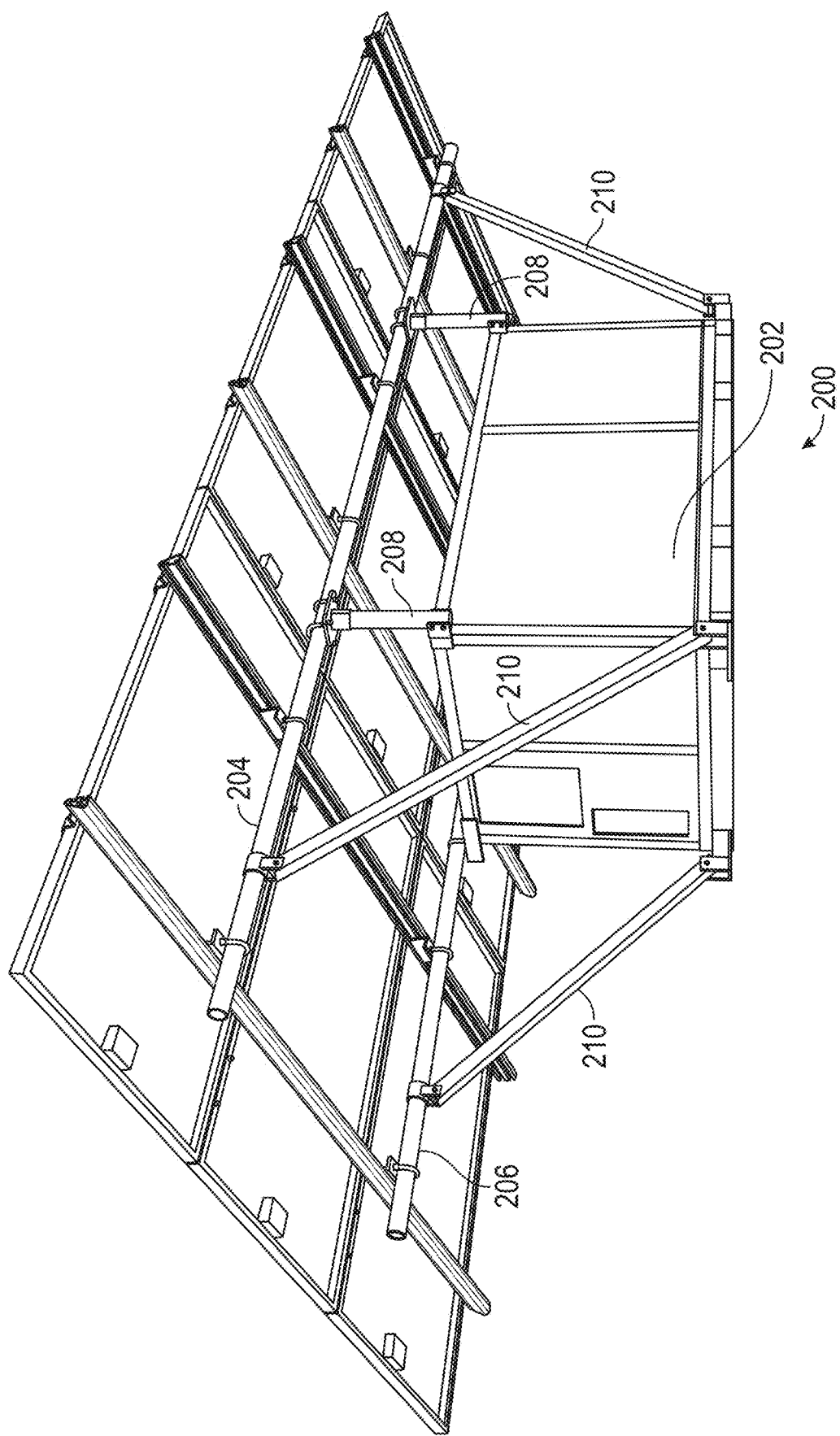
FIG. 2 illustrates a microgrid module according to an example of the disclosure.

FIG. 2 illustrates an embodiment of a microgrid module according to an example of the disclosure. In some embodiments, the microgrid module 200 may include a container 202 which may be a custom fabricated container of varying dimensions. Container 102 or container 202 may be used for transporting components, housing electrical systems, and providing a structural foundation for the sub-structure assembly that supports the solar rails and solar photo voltaic (PV) panels. The containers may contain pre-wired electrical equipment which may include, but is not limited to, solar inverters, batteries, battery inverters, conventional generators, communications, monitoring and control equipment. They may also include space for the storage of solar array, sub-structure assembly, brackets, rails, and solar panels for storage during shipment, as well as the tools required for assembly. The containers may be stacked or have additional equipment stacked and shipped on top of them. They may contain equipment and controls related to a Modular Intelligent Energy Management (MIEMS) system, which facilitates the electrical interconnection of multiple microgrid modules to allow for modular scalability and interaction with other generation resources such as existing renewable or conventional assets, or the grid.

Figure 3:
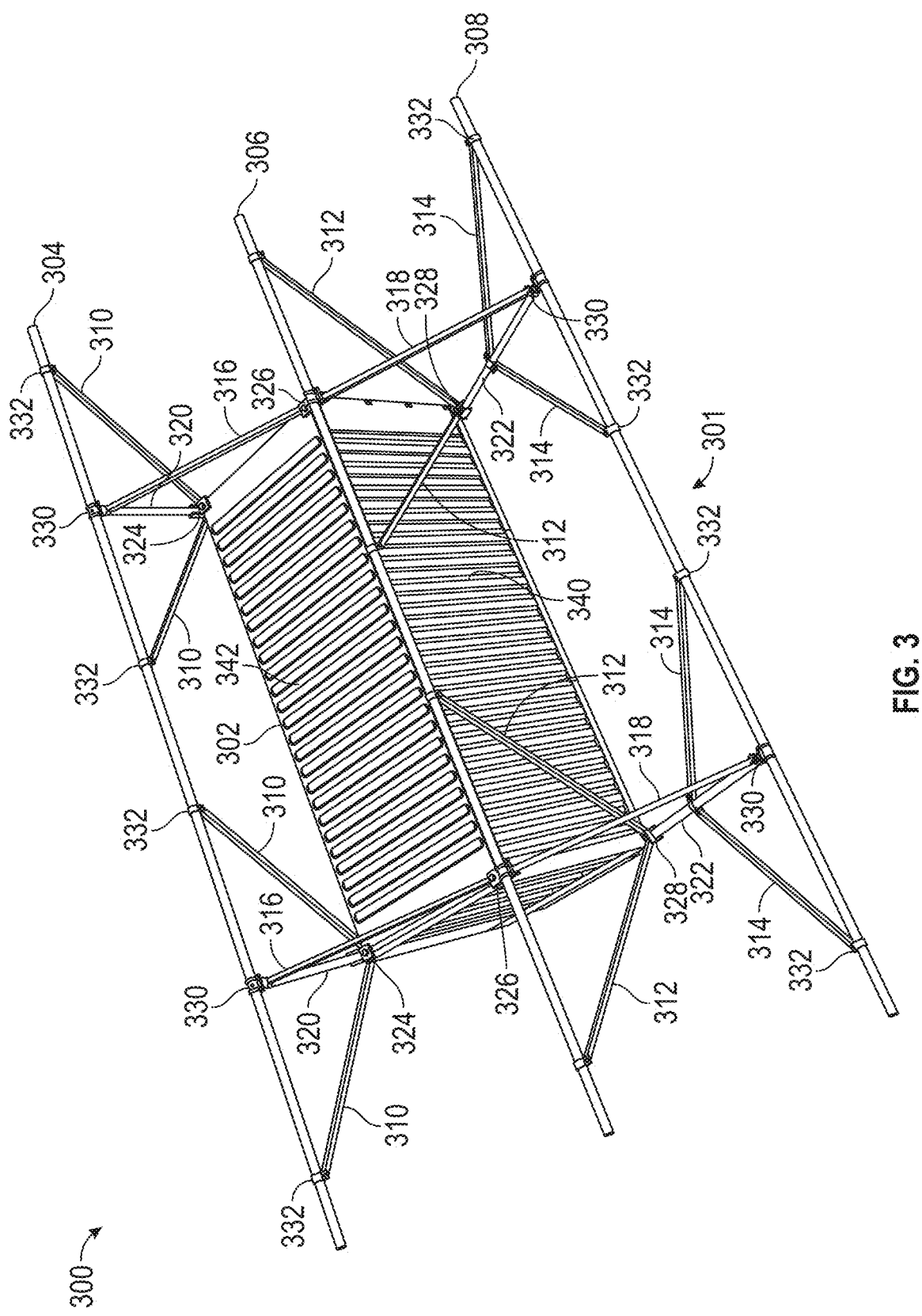
FIG. 3. illustrates a sub-structure assembly on a container, according to examples of the disclosure.

FIG. 3 illustrates a sub-structure assembly on a container, according to examples of the disclosure. The container 302 comprises a south side 340, north side (not depicted) parallel to the south side 340, a top side 342, a bottom side (not depicted) parallel to the top side 342. It is to be noted that other embodiments may include a subset or a superset of the sub-structure 301 components included in FIG. 3. The sub-structure 301 may comprise structural pipes, braces (square hollow structural sections of various dimensions) and pipes (round hollow structural sections of various dimensions) attached to the container 302 via container mounting brackets. The sub-structure 301 may also provide support and attachment points for a generic solar rail assembly which in turn may support solar photovoltaic panels designed to cover maximum area. The sub-structure 301 can come in various tilts and sizes to allow for a range of solar array sizes, container sizes, and optimized tilts for a variety of locations ranging from low to high latitudes.

In some embodiments, the sub-structure 301 may include a plurality of horizontal pipes. These may include, but are not limited to, an upper horizontal pipe 304, a mid horizontal pipe 306 and a lower horizontal pipe 308. The horizontal pipe supports, may be constructed of round hollow structural sections of varying dimensions and may provide attachment points for generic solar rails.

In some embodiments, the upper horizontal pipe 304 may be mounted on top of the upper pipe supports 320 using a top cap 330, may provide attachment points for a generic solar rail assembly, and may be supported by diagonal braces. The middle horizontal pipe 306 may mount directly to the south-top container mounting brackets 326 via multiple U-Bolts, may provide attachment points for the generic solar rail assembly, and may be supported by diagonal braces. The lower horizontal pipe 308 may be mounted to a top-cap 330 on the cantilevered lower pipe support 322, may provide attachment points for the generic solar rail assembly, and may be supported by diagonal braces.

In some embodiments, sub-structure 301 may include a plurality of braces (constructed of square hollow structural sections of varying dimensions) and pipe supports (constructed of round hollow structural sections). The thickness of the braces and pipe supports can vary depending on the design criteria of engineering loads.

In some embodiments, upper diagonal braces 310, may provide support between the north-top container mounting brackets 324 and the upper horizontal pipe 304. Middle diagonal braces 312 may provide support between the south-bottom container mounting brackets 328, and the middle horizontal pipe 306. Lower diagonal braces 314, may provide support between the lower pipe supports 322 (where they may be attached to double coupling sleeves), and the lower horizontal pipe 308.

In some embodiments, upper braces 316 may provide support between the upper pipe supports 320 and the south-top container mounting brackets 326, and may provide lateral structural rigidity to the upper horizontal pipe 304. Lower braces 318, may provide support between the lower pipe support 322 and the south-top container mounting brackets 326. They may also be under tension, maintaining the cantilever of the lower pipe supports 322 and the lower horizontal pipe 308.

In some embodiments, upper pipe supports 320 may attach to the north-top container mounting brackets 324 and support the upper horizontal pipe 304. They may also be used during assembly as pivoting arms (with their fulcrums at the north top container mounting brackets 324), raising the upper horizontal pipe 304 from the top of the container, to its upright position with the assistance of a winch and the upper brace 316. Additionally, lower pipe supports 322 may attach to the south-bottom container mounting brackets 328, and support the lower horizontal pipe 308 (cantilevered at a diagonal from the base of the container). They may also be used during assembly as pivoting arms (with their fulcrums at the south-bottom container mounting brackets 328), raising the lower horizontal pipe 308 from the surface of the ground, to its upright position with the assistance of a winch. The lower pipe supports 322 may also provide attachment points for one or more lower diagonal braces, which may support the lower horizontal pipe 308, and attach to the lower pipe supports 322 with double coupling sleeves. The north-top container mounting brackets 324, south-top container mounting brackets 326, south-bottom container mounting brackets 328, top-caps 330 and coupling sleeves 332 referenced above will be shown in more detail in FIGS. 6-7.

Figure 4:
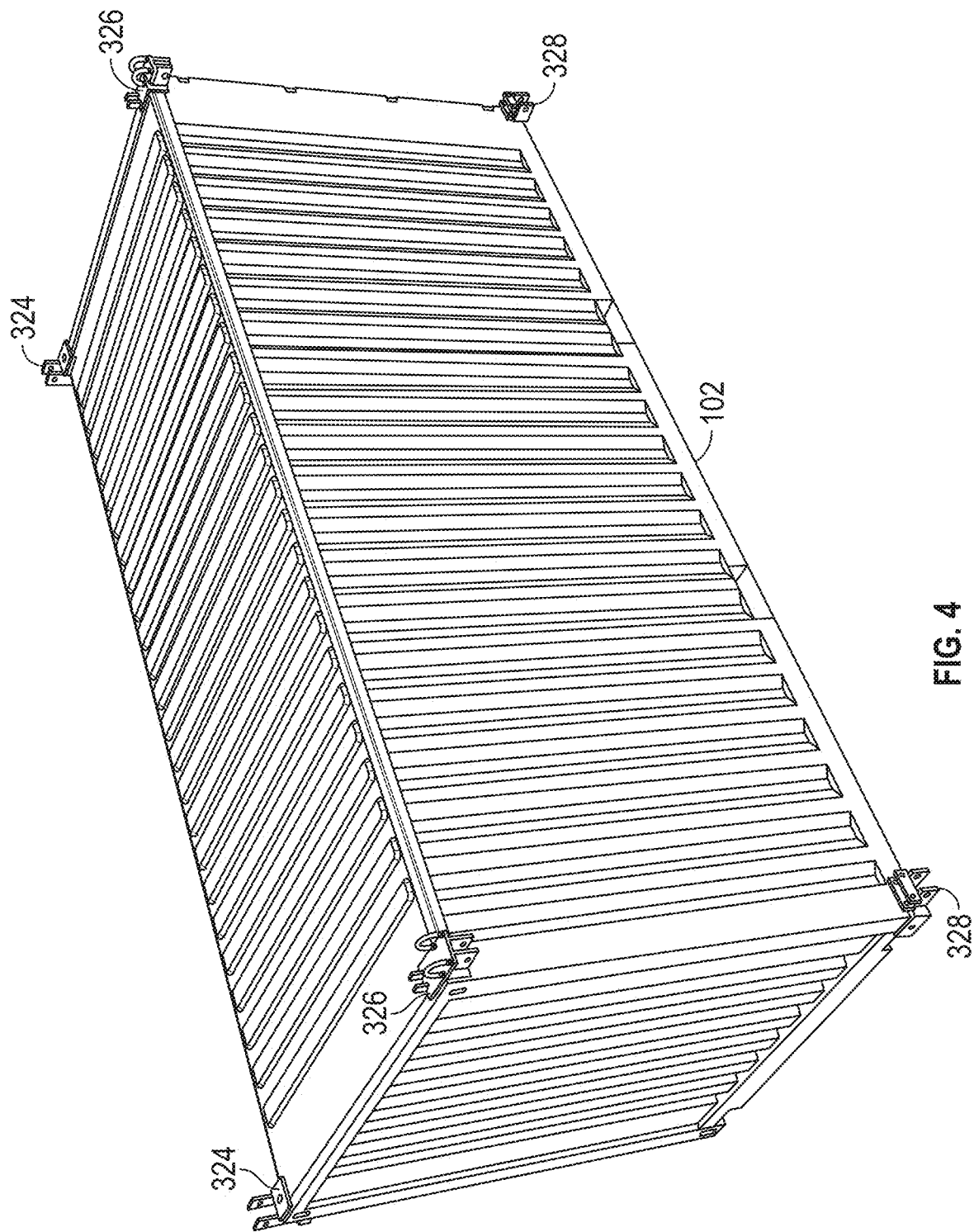
FIG. 4. illustrates a CONEX container with container mounting brackets attached according to examples of the disclosure.
Figure 5:
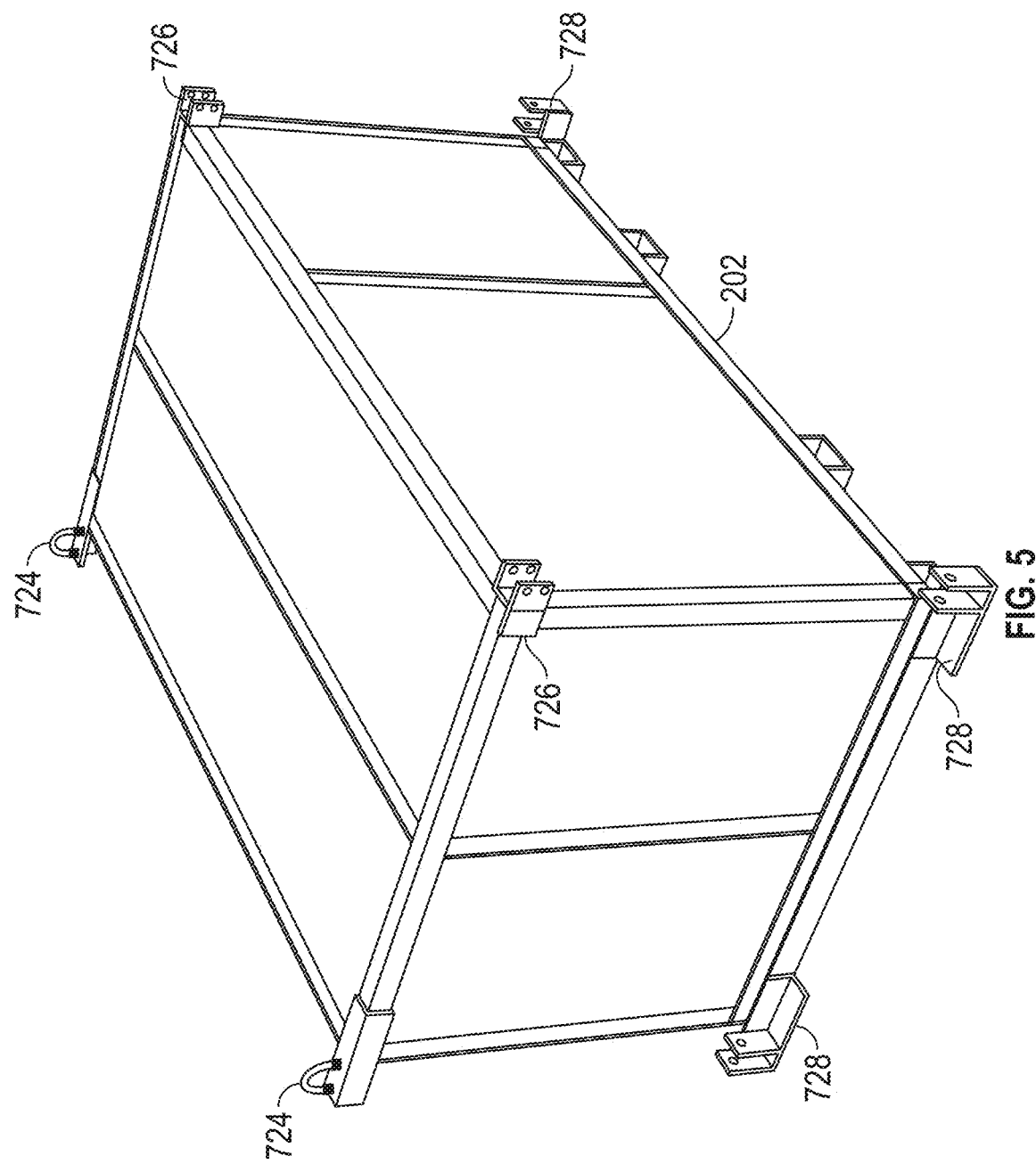
FIG. 5. illustrates a custom container with container mounting brackets attached according to examples of the disclosure.

FIGS. 4 and 5 illustrates container mounting brackets attached to a CONEX container and a custom container respectively. In some embodiments, container mounting brackets are utilized to attach the sub-structure 301 to the container. These brackets may be designed to attach to corners of the container without modification or penetration to the container. This is possible because CONEX shipping containers corners have standard universal dimensions and corner attachment points. Similarly, containers fabricated for custom-dimensioned systems also have standardized corner attachment points, regardless of overall container dimensions.

Figure 6:
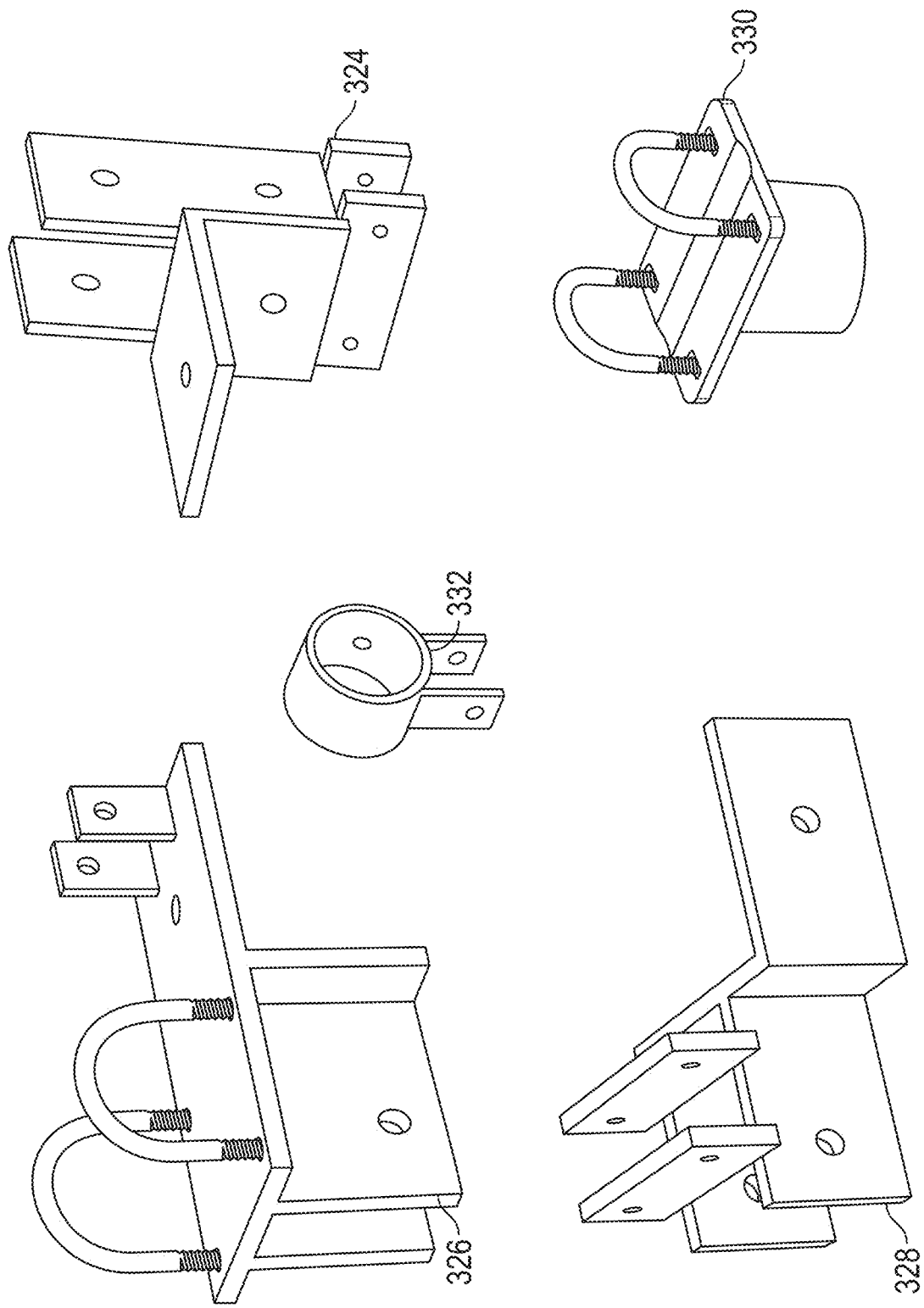
FIG. 6 illustrates container mounting brackets, a top cap, and a coupling sleeve for a CONEX container.

FIG. 6 illustrates one embodiment of container mounting brackets, a top cap, and a coupling sleeve for a CONEX container. In some embodiments, north top container mounting brackets 324 attach to the north top corners of the container 102 to provide attachment points for the upper pipe supports 320 and upper diagonal braces 310, both of which together support the upper horizontal pipe 304. The north top container mounting brackets 324 also provides a pivoting fulcrum point for the assembly of the upper horizontal pipe 304, allowing it to pivot from its initial assembled position on top of the container, to its final position above the north side of the container with the assistance of winches. They can also provide attachment points for the winches used in raising and lowering the horizontal crossbeam. Additionally, south top container mounting brackets 326, which can be formed from powder coated steel, can allow for support to the mid horizontal pipe 306 via U-bolt attachments and support to upper braces 316 and lower braces 318 via thru bolt attachments. Also, south-bottom container mounting brackets 328, which can be formed from powder coated steel, can allow for lower pipe supports 322 and additional brace attachments via thru bolts.

In some embodiments, top-caps 330 are used to attach structural pipe, tubing, or other hollow structural sections at perpendicular angles. In one example, a top cap may be used to attach an upper horizontal pipe 304 perpendicularly to the top of an upper pipe support 322.

In some embodiments, coupling sleeves 332 are used to form a connection between structural assembly members of different sizes and shapes at a variety of angles. In one example, a coupling sleeve may be used to attach a square brace to a round pipe, at a variety of different angles. Combinations of square structural members and coupling sleeves form the braces in the invention.

Figure 7:
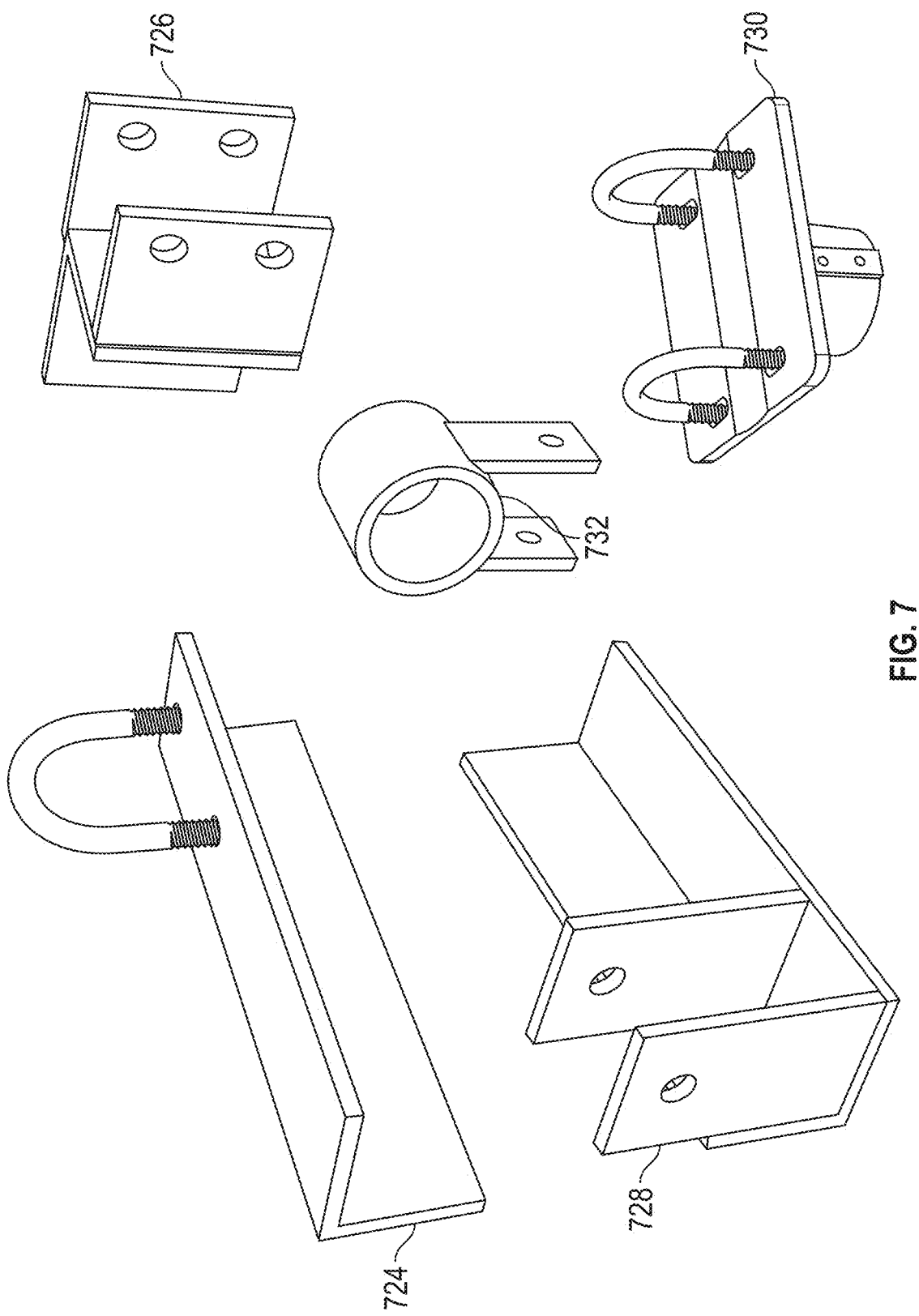
FIG. 7 illustrates container mounting brackets, a top cap, and a coupling sleeve for a custom container.

FIG. 7 illustrates one embodiment of container mounting brackets, a top cap, and a coupling sleeve for a custom container. In some embodiments, north top container mounting brackets 724 attach to the north top corners of the container 202 to provide attachment points for upper pipe supports 208 to support an upper horizontal pipe 204. Additionally, south top container mounting brackets 726 can attach to a lower horizontal pipe 206. Also, bottom container mounting brackets 728 provide attachment points for lower pipe supports 210 providing support to upper horizontal pipe 204 and lower horizontal pipe 206. In some embodiments, top-caps 730 are used to attach structural pipe, tubing, or other hollow structural sections at perpendicular angles. In one example, a top cap may be used to attach the upper horizontal pipe 204 perpendicularly to the top of the upper pipe support 208. In some embodiments, coupling sleeves 732 are used to form a connection between structural assembly members of different sizes and shapes at a variety of angles. In one example, a coupling sleeve may be used to attach a square brace to a round pipe, at a variety of different angles. Combinations of square structural members and coupling sleeves form the Braces in the invention.

FIG. 8 illustrates a double coupling sleeve, according to examples of the disclosure. In some embodiments, for attachment points requiring multiple braces attached to a single point, double coupling sleeves 802 may be used. For example, a double coupling sleeve 802 can attach two braces to a support pipe.

Microgrid modules may be compatible with a variety of foundation options for various locations and design loads. For example, foundations can be based on the requirements of the Authority Having Jurisdiction (AHJ). In some embodiments, penetrating ground screws or helical soil anchors can be used to fix the container to the earth or an existing asphalt pad. Other foundation options may utilize the existing structural capacity of the modular container. Additionally, brackets may be used to provide additional attachment points for mounting the container to a soil, gravel, or concrete pad. A container may use any combination of described foundation techniques.

Figure 9:
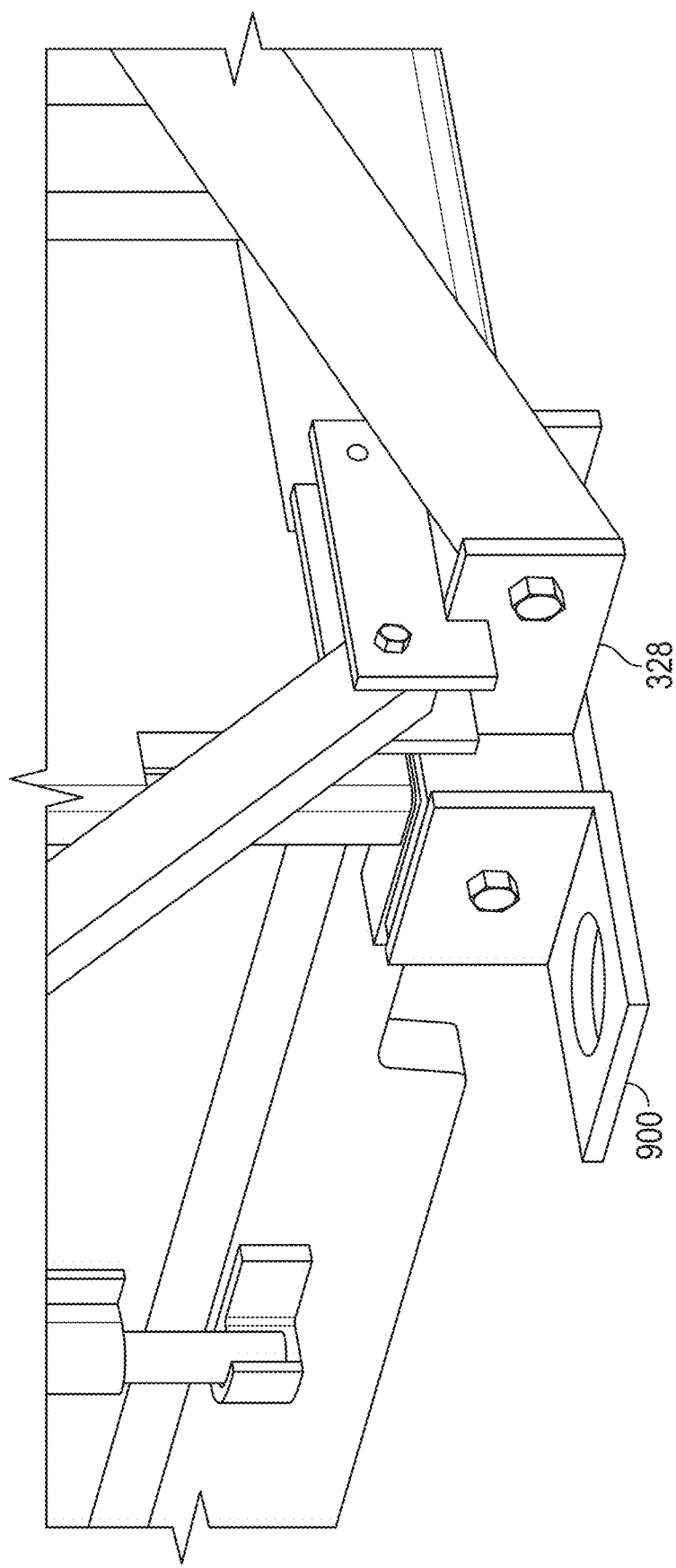
FIG. 9 illustrates an embodiment of a container anchoring bracket attached to the south-bottom corner container mounting bracket.

FIG. 9 illustrates an embodiment of a container anchoring bracket 900 attached to a south-bottom container mounting bracket 328. The container anchoring bracket 900 may provide a structural attachment point for the fixation of the modular container to a soil, gravel, or concrete pad using helical soil screws, bolts, gabion baskets, or any other fixation method.

FIG. 10 illustrates another embodiment of a container anchoring bracket 1000 attached to the north-bottom corner of a CONEX container, providing an attachment point for the fixation of the modular container to a soil, gravel, or concrete pad using helical soil screws, bolts, gabion baskets, or any other fixation method.

In some embodiments, the internal space of the container can be designed to function as a large gabion basket. The container can be strategically filled with rocks, concrete, sand, water, or other ballast material to weigh down the base of the structure and reduce the need of a foundation. This method can be used in conjunction with any of the container anchoring brackets described above. A partition wall may be added to the inside of the container to provide separation between the space used for ballast material, and the space utilized by all other components of the modular microgrid.

In some embodiments, a submerged secondary container, filled with ballast material can also function as a submerged foundation for the microgrid container by submerging it. The north-bottom and south-bottom container mounting brackets can function as attachment points between the two containers. This method can be used in conjunction with utilizing the container space as a gabion box. As an alternative to container anchoring brackets, generic container twist lock connectors can be used to securely link the two containers together.

In some embodiments, a new or existing concrete pad, sufficiently engineered and reinforced to withstand the applied loads, can be utilized to anchor the container via structural bolts from the north-bottom and south-bottom container mounting brackets to the concrete slab.

In some embodiments, modifications can be made to a modular container to optimally use the space within the container and the structural elements of the container. These modifications may include, but are not limited to an internal support system, a packing system for shipping substructure elements, a DC junction box etc. A container may use any combination of described foundation techniques.

In some embodiments, an internal support system comprising an array of metal channels may be welded to the interior of the modular container walls. This system can provide attachment and support for items including, but not limited to, electrical equipment, battery boxes, wall mount battery brackets, battery mounting system, conduit, electrical junction boxes, raceways, and the racking system for shipping sub-structure 301 elements.

Figure 11:
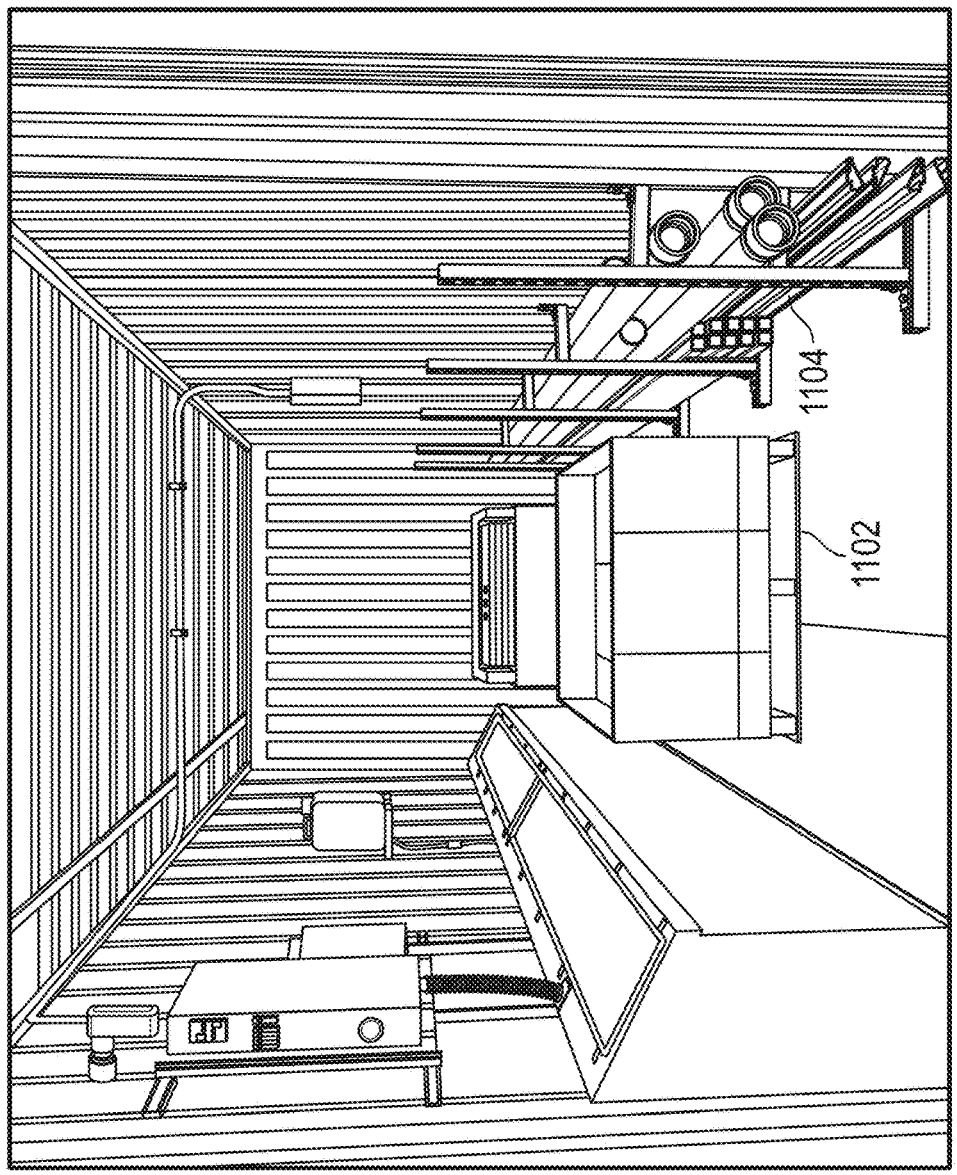
FIG. 11 illustrates a packed container containing a packing system for substructure elements in one embodiment.

FIG. 11 illustrates a packed container containing a packing system for substructure elements in one embodiment. In some embodiments, the packing system can include movable custom palletization 1102 to contain hardware and equipment for commissioning according to examples of the disclosure. During shipping, the substructure elements can be packed and secured inside the packing system. In some embodiments, a racking system 1104 can be attached to the container walls. The racking system 1104 may be designed to secure sub-structure 301 components and micro grid components to the container walls via bolted metal channels, steel banding, or wood palletization. The racking system 1104 can also employ quick and easy install techniques, including color coding and single person removal of items.

Figure 12:
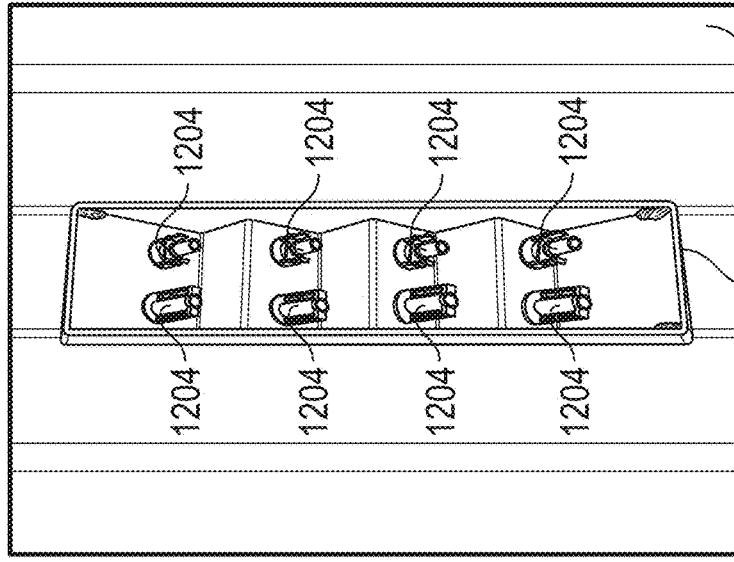
FIG. 12 illustrates a DC junction box according to examples of the disclosure.

FIG. 12 illustrates a DC junction box according to examples of the disclosure. In some embodiments, a DC junction box 1202 can be used as the external location for solar panels to be connected to the electrical system internal to the container. The DC junction box 1202 can provide a weather-tight quick connection point for the solar strings to penetrate the box using quick-connect electrical connectors and without any onsite wiring. The quick connect connectors can be multi-contact MC4 type connectors 1204, although other connectors can be used. These connectors can be exposed on the exterior of the container. During shipping, a cover plate can optionally be added to protect the connectors from damage or exposure to corrosive materials. A container can have a prefabricated DC junction box 1202 welded or otherwise connected to its south side. In some embodiments, the DC junction box 1202 can have eight holes for MC4 male and female connectors allowing for up to four strings of solar panels, although other numbers of connectors can be employed to allow for many different configurations of solar panels. Multiple DC junction boxes can be added for additional connection points and AC junction boxes can also be added for the connection of AC generation sources and loads. In some embodiments, disconnecting tools can be provided with the DC junction box 1202 for its easy disconnection or disassembly.

Other container modifications and features can include, but are not limited to, general ventilation ducts, generator ventilation, integration of a generator heat capture system, generator oil pan and spill containment, generator sub base or adjacent fuel tank with secondary containment, theft proof external generator refueling cap, Alternating Current (AC) wire out holes, communication wire out holes, AC out weather heads, grounding attachments points, additional bracket connection points, insulation, a ventilation fan on ceiling of container, air conditioning/heating unit, and a dehumidifier.

Modular microgrid systems provide a flexible source of electrical power that can be configured in many different variations to adequately service a wide range of loads. In some embodiments, a generic solar rail assembly may be attached to the top of the sub-structure 301 to provide an attachment point for a solar PV panel array, wiring, and associated solar equipment. The size of the solar array can be as large as 60 72-cell solar panels, or more. Each solar panel is attached to the solar rail assembly with a clip assembly that secures the panel to the rail and creates an electrical bond. Wires from panels can be secured to the solar rail assembly and sub-structure 301 via solar panel wire clips, zip ties, or other attachment mechanisms. The wire leads of the solar panels can be connected together via the existing MC4 connections to form strings. These strings can be extended on site with MC4 cables and the connections can terminate with a quick and easy snap connection at the DC junction box 1202.

In some embodiments, the solar panels can be connected to a battery bank with a charge controller located inside the container. The power can then be stored in the battery bank and distributed on demand for the loads. This setup may have DC load centers and breakers for power distribution. In one example, a modular microgrid DC power system can provide a 48V power supply. Other embodiments can supply 12V and 24V from the battery bank or transformer depending on the load type and run time.

The microgrid module 100 can have several different embodiments. In some embodiments, the microgrid module 100 can be a grid tied solar container and may come with the electrical system prewired. It may comprise a container-mounted solar array and a grid-tied inverter system. The structural components and solar panels may be shipped in the solar container box and may require only a few hours to assemble. Assembly may require only two electrical connections, may not require a foundation and may be done by non-electricians. The solar container can be compatible with utility grids and can be compatible with the solar battery containers for adding extra solar production. Solar containers can be offered in systems for 240V/60 Hz, 230V/60 Hz, 480V/60 Hz, and 400V/50 Hz applications, which covers many U.S.A. and international utility applications.

In some embodiments, the microgrid module 100 can be a standalone solar battery container. The solar battery container can be a standalone battery based solar power station that comes with the electrical system prewired. It may include a container-mounted solar array, a battery energy storage system, an inverter and an electrical control system capable of functioning as a standalone power source, or in conjunction with an electrical grid. The structural components and solar panels can be shipped in the box and assembled quickly on site. Assembly may require only two electrical connections, may not require a foundation and may be done by non-electricians. Solar battery backup can provide extended reliable power and energy security in the event of a power outage, and can be capable of peak power shaving. The solar battery container can be grid-tied and off-grid compatible. It can also be ready for auto-start generator hookup. Systems can be configured for 240V/60 Hz, 230V/60 Hz, 480V/60 Hz, and 400V/50 Hz applications, which covers many U.S.A. and international utility applications.

In some embodiments, the microgrid module 100 can be a solar battery generator container. The solar battery generator container can be a solar battery container with an integrated generator system. It can include, but is not limited to, a solar array, battery bank, electrical inverter and management system, and an internal combustion generator capable of operating off-grid or grid-tied. The solar battery generator can function as backup to the battery bank system. If the solar panels do not produce enough for the loads, then the generator can provide supplemental power for loads and charging. In a grid-tied application the generator can function as a backup power source in the event of extended outage. Grid-tied applications may require an additional auto transfer switch between the generator and the grid.

In some embodiments, multiple solar battery containers can be linked together to form a distributed micro-grid system capable of meeting loads of different magnitudes. In some embodiments, multiple solar battery generator containers can be linked together, utilizing a frequency and phase matching controller to enable multiple generators to run in parallel.

In some embodiments, for custom design situations, a load profile may need more solar production than a single box can provide. Solar containers can be wired into a battery container to optimize power production, or integrated with a new or existing ground or roof-mount solar array for the provision of additional solar capacity.

In some embodiments, the electrical system associated with the microgrid module 100 may include extra features. These extra features of the electrical system can include, but are not limited to, an LED lighting system with occupancy detection, outlets and load centers, wiring leads for future use for easy installation of a utility or generator, a ventilation system, and an air conditioning system.

Due to the flexibility of the modular microgrid system, there are many applications that the system can support. Example applications include, but are not limited to, alternative ground mount racking systems for solar, agricultural, and telecom stations, off-grid power for community or commercial use, grid tied power for commercial or residential use, peak power shaving, mid-scale micro-grids, water pumping with DC power, supplementary power for existing micro-grids, grid-tied supplemental generation and storage, utility controlled distributed energy resource, and as a component of an aggregated virtual power plant.

In some embodiments, modular microgrid systems can allow remote online monitoring. This monitoring may include remote troubleshooting, report generation, maintenance notifications, and diagnostic services. In the absence of internet connectivity, remote monitoring can be provided over cellular, satellite, radio, or any other communication method.

In some embodiments, modular microgrid systems can be controlled remotely. Programmable settings can be changed and functions can be initiated remotely through an online portal.

In some embodiments, modular microgrid systems can link together to form larger grids, and they can be expanded to increase output. Additional load centers may be required for this grid creation. The appropriate load center can be installed onsite for retrofits, or in the container during the warehouse fabrication process.

FIGS. 13-21 illustrate portions of the microgrid module assembly process according to examples of the disclosure. The assembly process can include, but is not limited to, attaching all required container mounting brackets to the modular container, assembling and raising the sub-structure assembly, attaching the generic solar rail assembly, installation of the solar PV panels, and finally wiring of the system.

As discussed above FIG. 4 and FIG. 5 illustrate the container mounting brackets attached to CONEX or custom containers, according to examples of the disclosure. These container mounting brackets are attached to the corners of the containers without making any modifications, or penetrations to the container.

Figure 13:
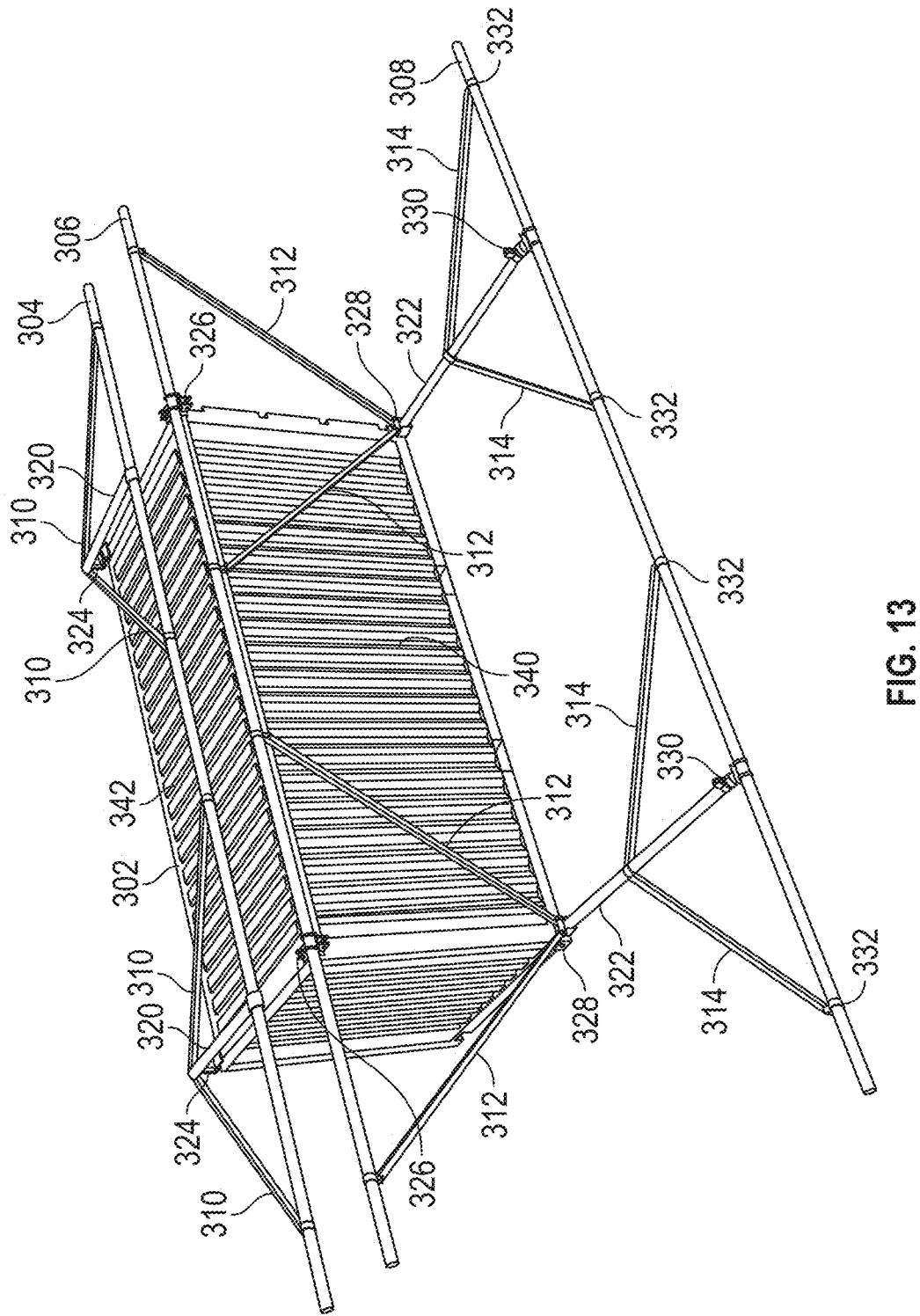
FIGS. 13-16 illustrate the substructure assembly process according to examples of the disclosure.

FIG. 13 illustrates the assembly of the upper horizontal pipe 304, middle horizontal pipe 306, and lower horizontal pipe 308. The upper horizontal pipe 304, lower horizontal pipe 308, and their associated braces may be assembled on top of the container, and on the ground respectively.

Figure 14:
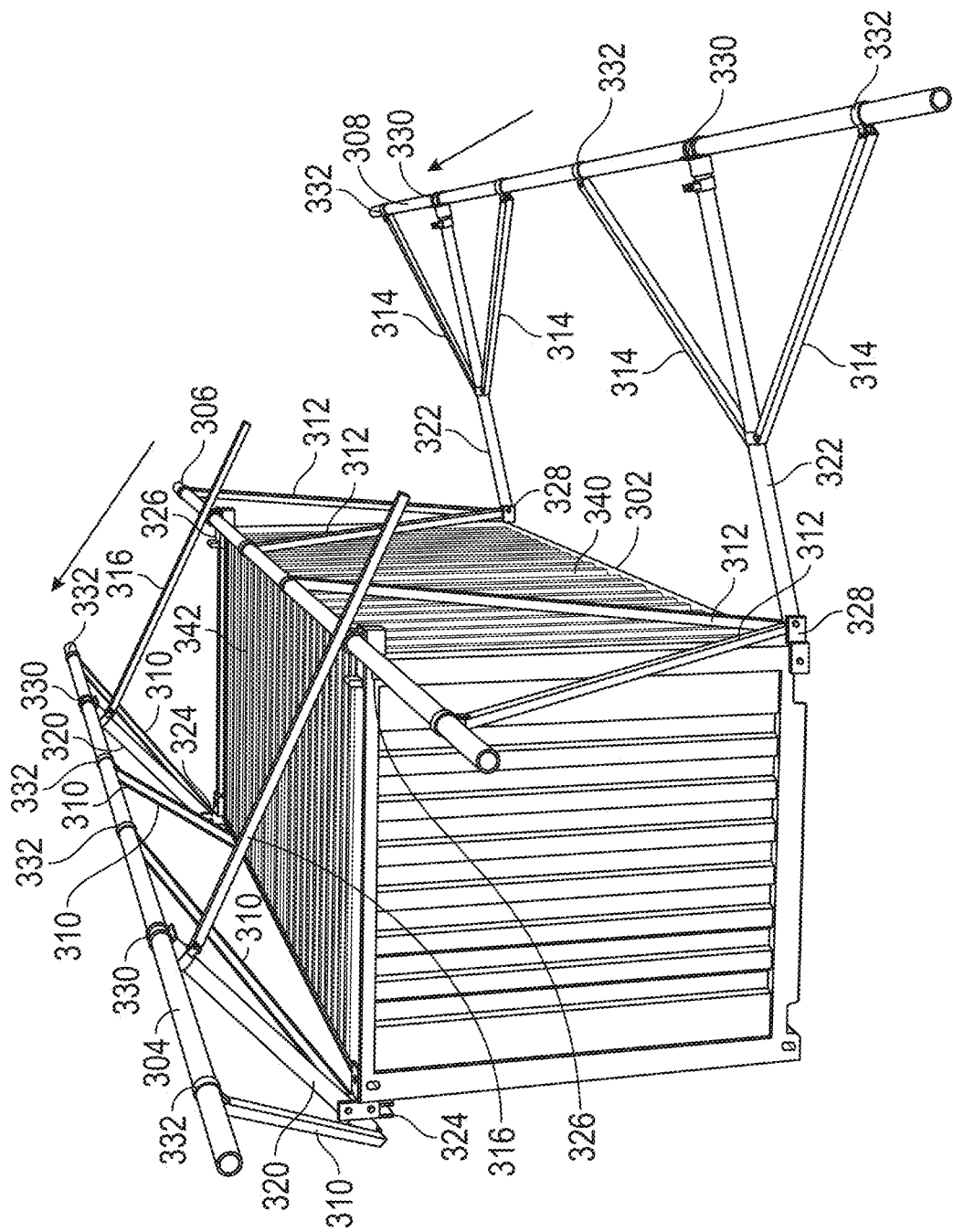

FIG. 14 illustrates the pivoting of the upper horizontal pipe 304 and lower horizontal pipe 308, from their initial assembly positions (on top of the container or ground) to their final upright positions. The upper horizontal pipe 304 may pivot on the attachment points for the upper pipe supports and the north-top container mounting brackets 324. The lower horizontal pipe 308 may pivot on the attachment points of the lower pipe supports 322, and the south-bottom container mounting brackets 328. These connection points may serve as hinges for the two assemblies. The raising and lowering of the upper horizontal pipe 304 and the lower horizontal pipe 308 may be conducted using winches, attached to the north-top container mounting brackets 324. The middle horizontal pipe 306 may be raised from the ground to the top of the container using the winches attached to the north top container mounting brackets 324, and then may be attached to the south top container mounting brackets 326. In this way, all of the horizontal pipes may be raised to their positions without the assistance of heavy machinery or specialized equipment; enabling the installation to be conducted by only two people.

Figure 15:
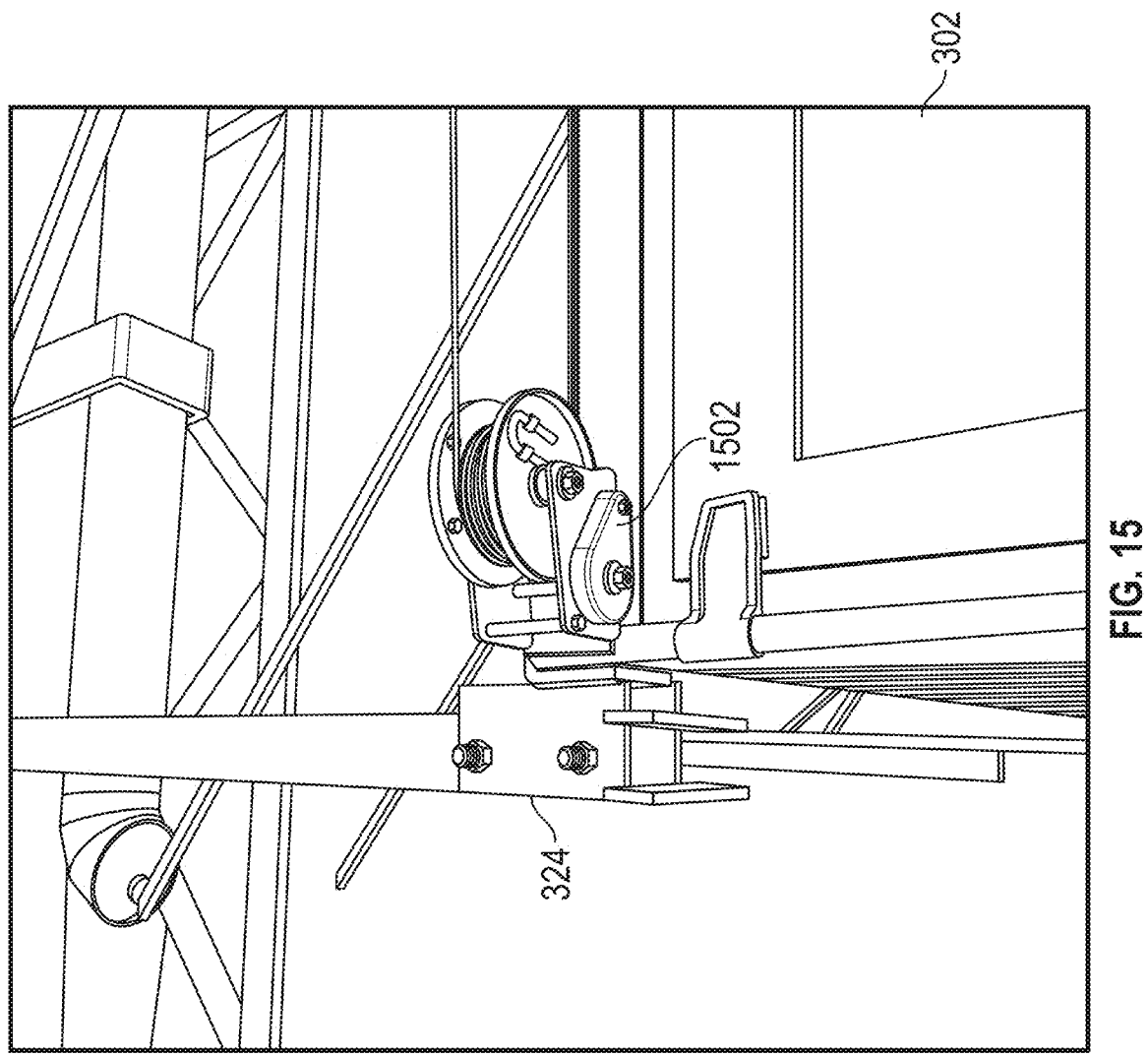

FIG. 15 illustrates the attachment of a winch 1502 to the north-top bracket 324, where it may be used for raising and lowering the upper horizontal pipe 304, middle horizontal pipe 306, and lower horizontal pipe 308. In other iterations, the winch may be attached elsewhere on the container, utilizing various combinations of braces and pulleys to accomplish the raising and lowering of any sub-structure 301 components.

Figure 16:
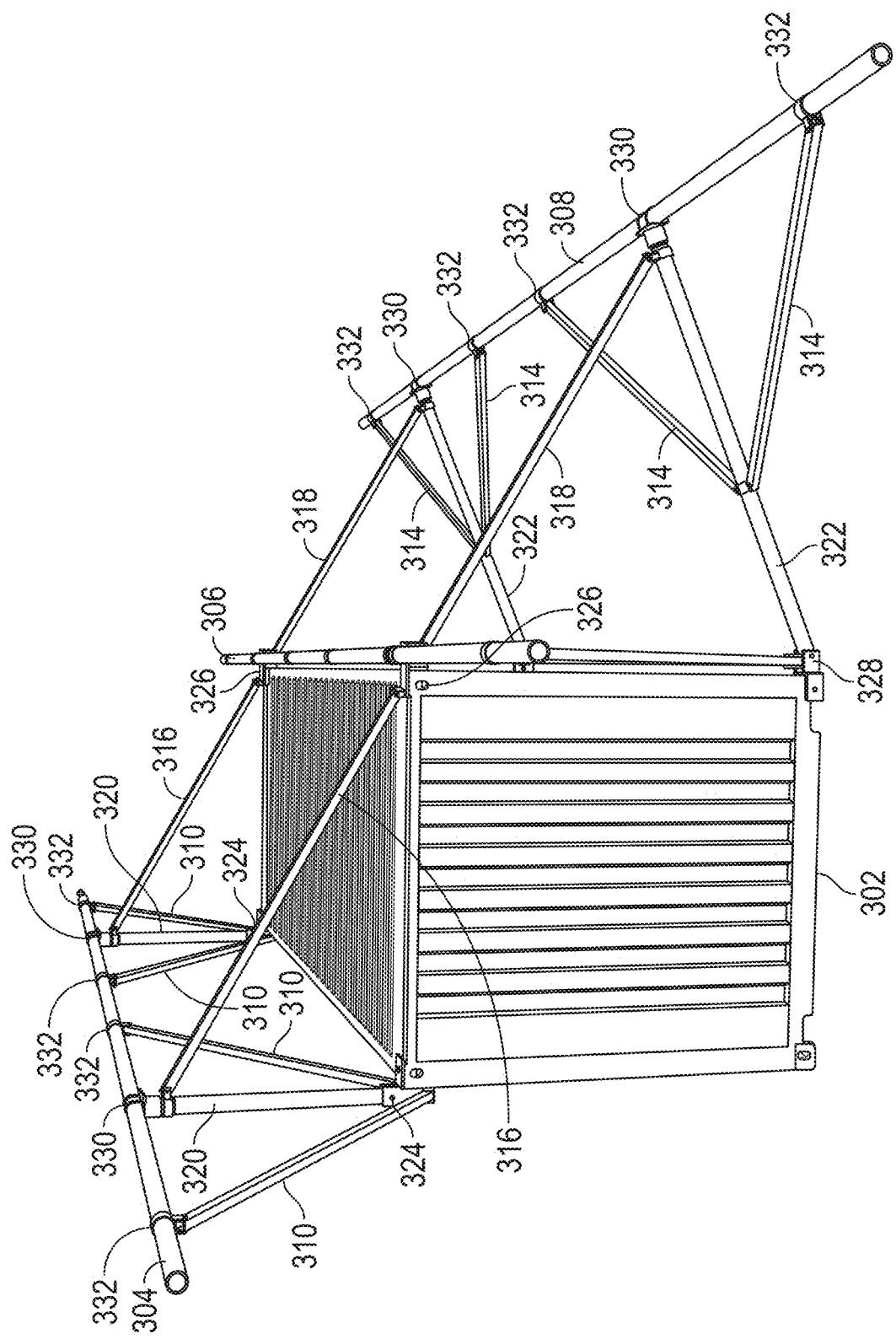

FIG. 16 illustrates the upper horizontal pipe 304, middle horizontal pipe 306, and lower horizontal pipe 308 in their final positions after being raised by the winch, and supported by upper braces 316, lower braces 318, upper diagonal braces 310, lower diagonal braces 314, upper pipe supports 320 and lower pipe supports 322 according to examples of the disclosure.

Figure 17A:
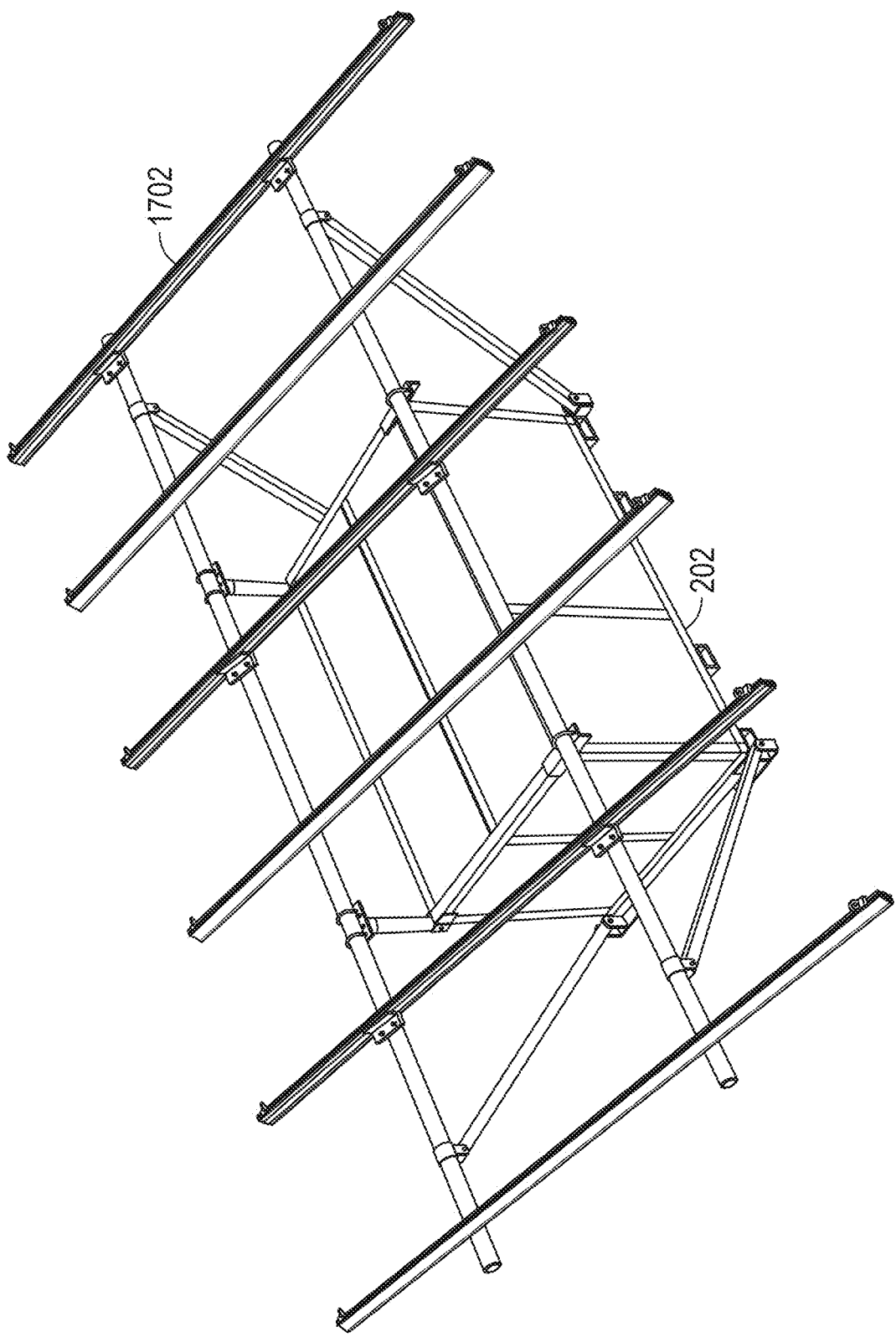
FIG. 17A illustrates a generic solar rail assembly attached to the sub-structure assembly on a custom container.
Figure 17B:
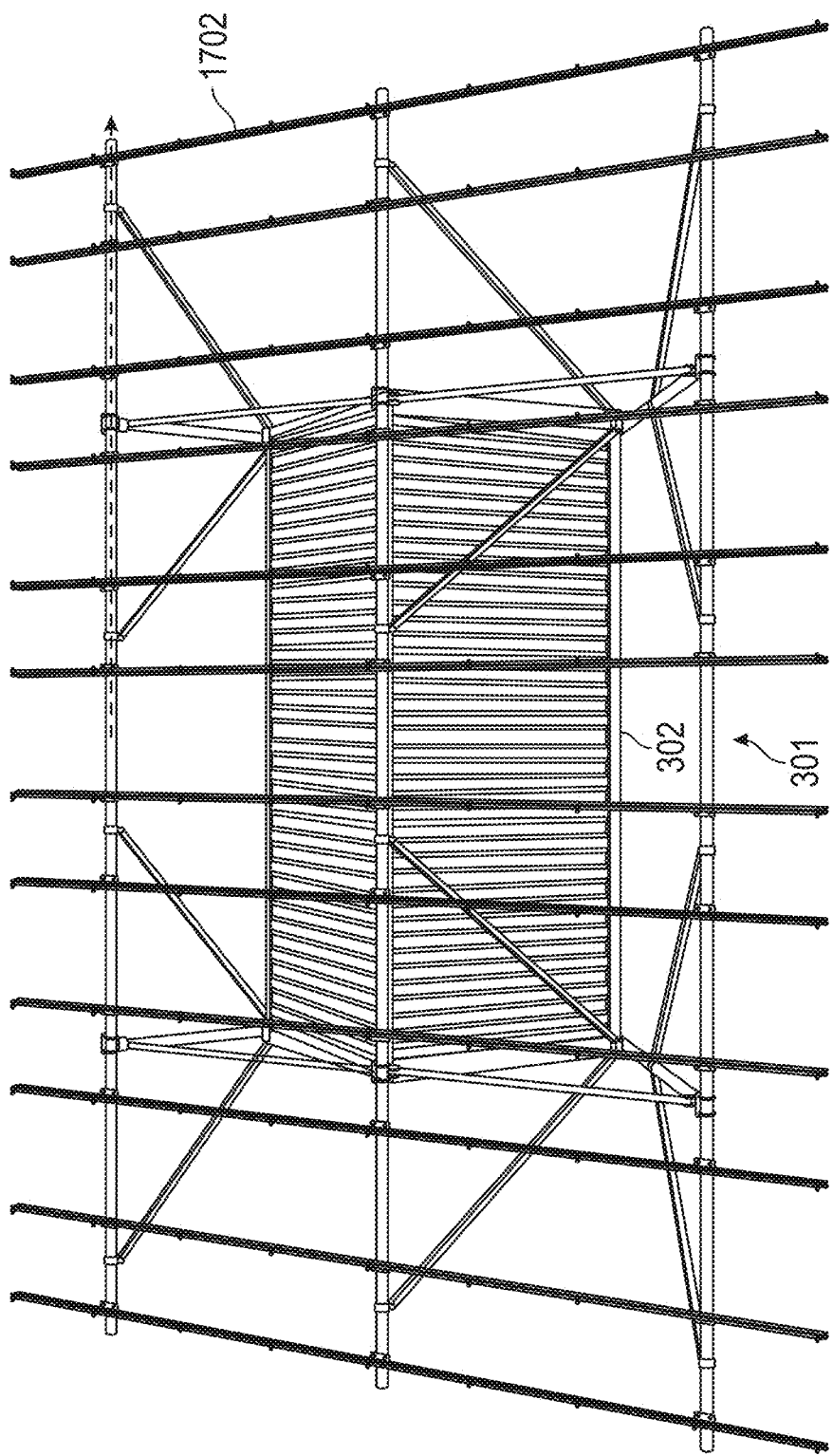
FIG. 17B illustrate a generic solar rail assembly attached to the sub-structure assembly on a CONEX container.

FIGS. 17A-B illustrate a generic solar rail assembly attached to the modular microgrid sub-structure assembly on a custom container and a CONEX container respectively. In some embodiments, a solar rail assembly 1702 may attach to the horizontal pipes in sub-structure 301 via generic L brackets and generic U-bolts, wherein the L bracket is attached to a solar rail, the U-bolt is attached to the L bracket and the horizontal pipe is attached through the U-bolt.

Figure 18:
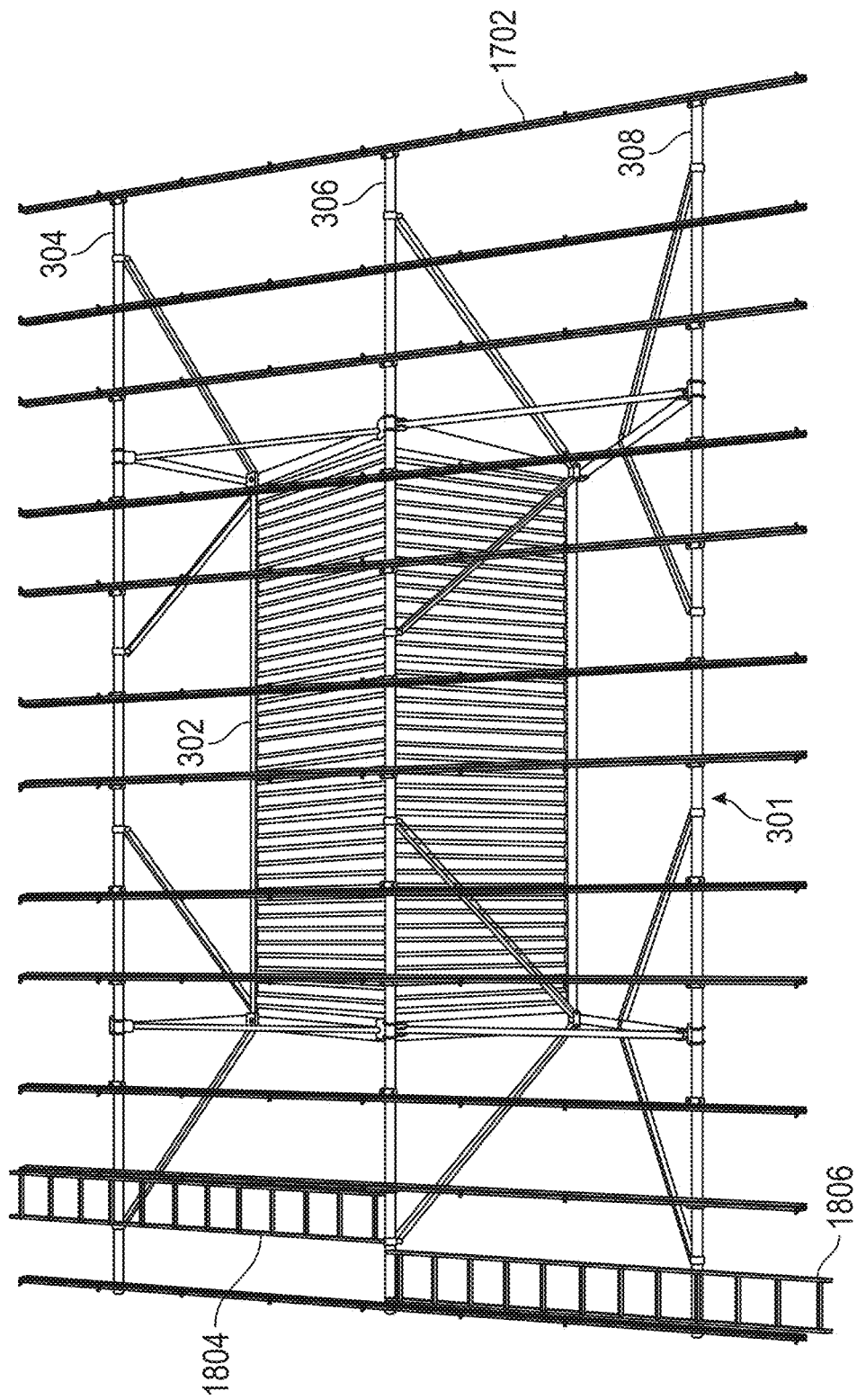
FIGS. 18-21 illustrate the solar panels assembly process according to examples of the disclosure.

FIG. 18 illustrates a ladder and pulley assembly used for the installation of generic solar PV Panels. In some embodiments, once the solar rail assembly 1702 is attached to the sub-structure 301, the solar PV panels can be slid up the solar rails using a ladder and pulley system. This system can increase the speed of the array installation process without heavy equipment such as a crane or bucket truck, while providing a safe and secure 'belay system' for the installer, similar to those used by rock climbers or roofing installers. The ladder and pulley system can include a ladder assembly including a top ladder 1804 and a bottom ladder 1806, webbing straps or another quick releasable attachment mechanism to secure the ladders to the horizontal pipes in the sub-structure 301, a solar panel raising system which can include a rope, an auto-locking rope safety mechanism, a safety harness, solar panel clips, a pulley, and a pulley extension mechanism to enable extending the pulley above the top end of the top ladder if required.

Figure 19:
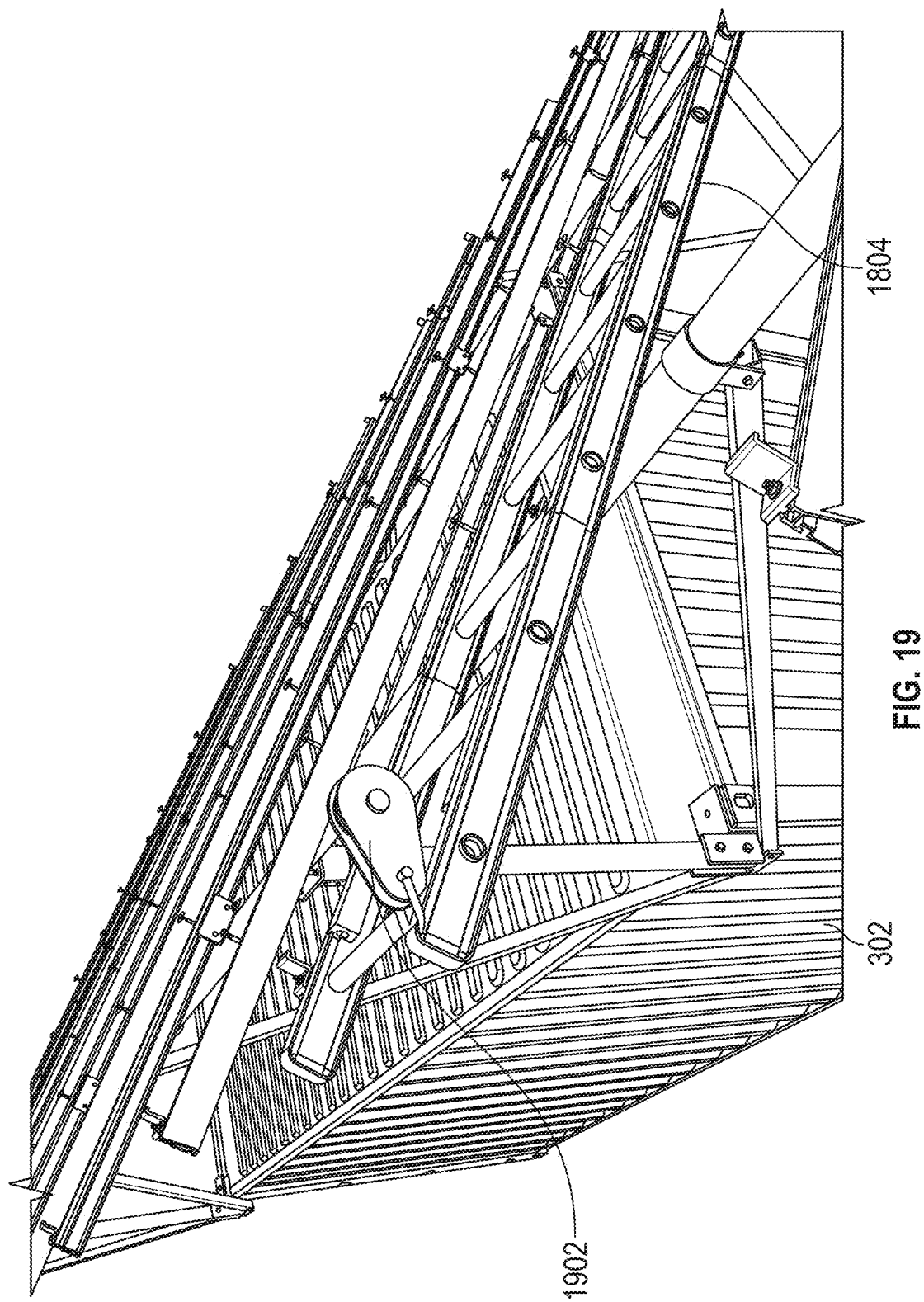
Figure 20:
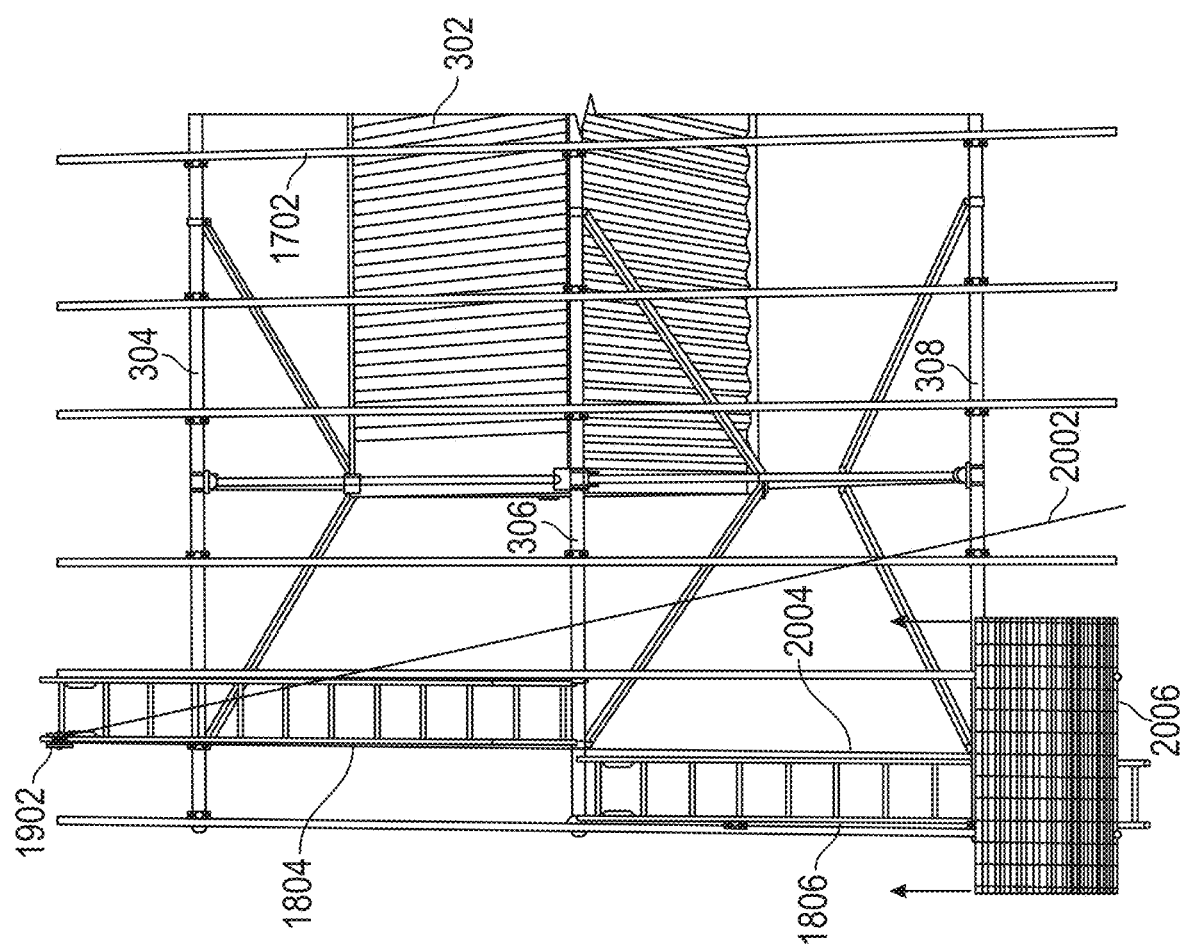
Figure 21:
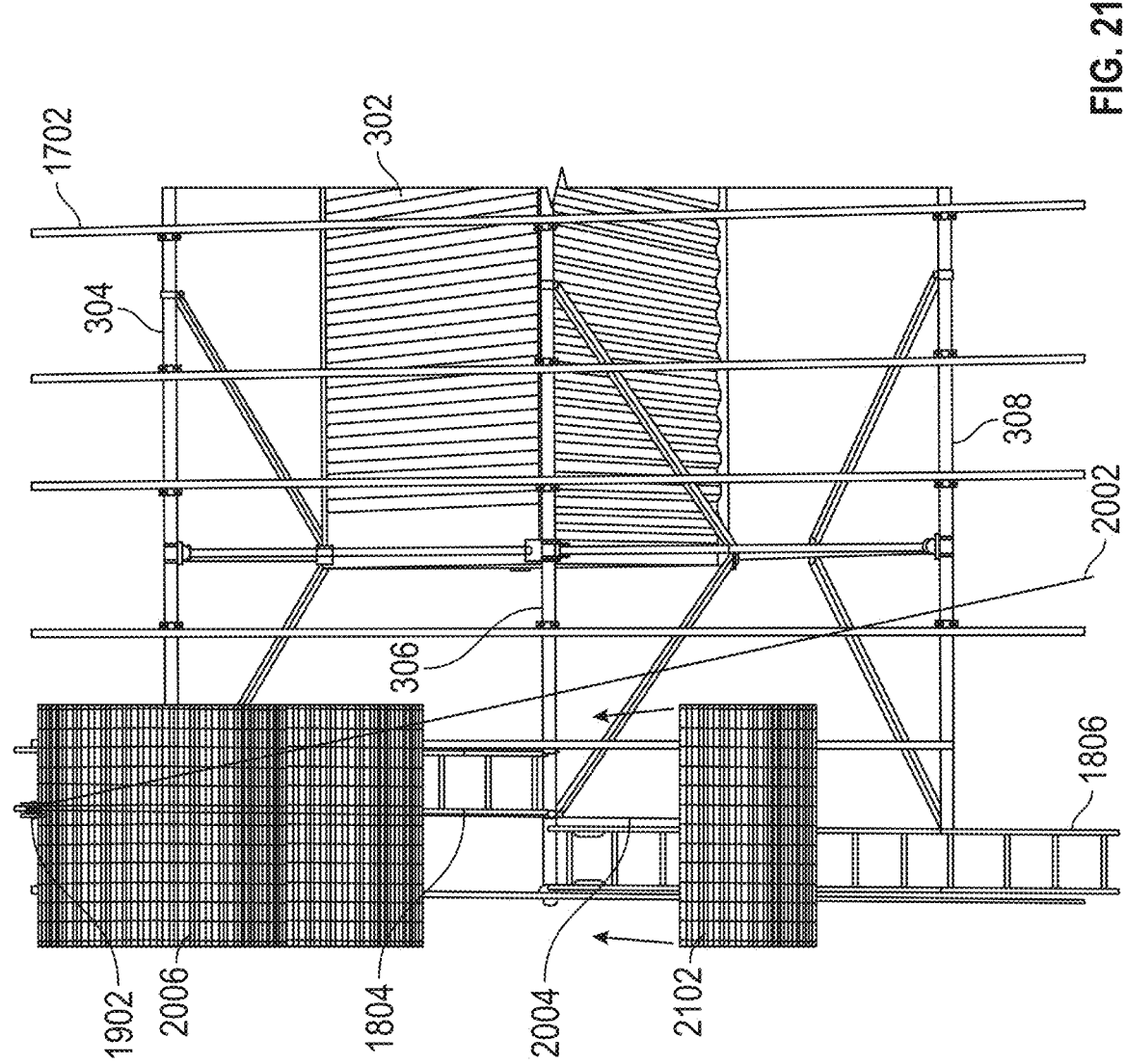

FIGS. 19-21 illustrate the process for installing solar panels. This can include, but is not limited to, attaching a pulley 1902 to the top of the top ladder 1804, placing the bottom ladder 1806 between two solar rails, securing the bottom ladder 1806 to the horizontal pipes with quick-mount clamps or straps, and using the bottom ladder 1806 as a scaffold to slide the top ladder 1804 into position while a first installer climbs the bottom ladder, so that the top ladder 1804 extends at least 3 feet above the upper horizontal pipe 304, and attaching the top ladder 1804 in place. The process can further include threading an appropriately rated safety/climbing rope through the pulley 1902 so that both sides of the rope lie on the ladders. Hereafter, one side of the rope can be referred to as the 'belay' end 2002, and the other as the 'panel' end 2004.

The process can further include the first installer attaching a solar panel 2006 to the panel end 2004 of the rope using a solar panel clip assembly attached to a locking carabiner or similar device. Then, using an approved safety tether, the first installer can attach themselves to the panel end 2004 of the rope using the locking carabiner or similar device to provide them with a continual safety line in the event of slipping or falling. The tether, harness and carabiner devices that attach the first installer to the safety line may be Occupational Safety and Health Administration (OSHA) approved safety gear. Thereafter, a second installer can thread an auto locking rope safety mechanism through the belay end 2002 of the rope to help hold the rope in case the first installer takes a fall. Next, the second installer can start pulling on the belay end 2002 of the rope, which can cause the solar panel 2006 to slide up the bottom ladder while the first installer can follow the solar panel 2006 and walk up the two ladders. The second installer can keep pulling until the solar panel 2006 is all the way to the top of the solar rail assembly 1702, at which point the first installer can attach the solar panel 2006 to the solar rail assembly 1702 using generic solar panel mounting equipment. Next, the first installer can unattach the solar panel clips from the solar panel 2006 and return to ground. This installation process can then be repeated for the next solar panel 2102 which can be installed directly below the solar panel 2006, and then the next panel until all the panels in a vertical column on the solar rail assembly 1702 are installed. At a point halfway in the column, the top ladder 1804 can be slid down next and parallel to the bottom ladder 1806 so that the pulley mechanism can continue to be used to hoist panels up for the lower half of the column.

In the process described above, the solar panels are installed in a top to bottom manner as opposed to a left to right or right to left approach. This enables the first installer to climb up and down the ladders without making a transition to the next adjacent column on the solar rail assembly, thereby making the installation process safer and more efficient. The top to bottom installation approach is also better than a bottom to top approach because it allows the first installer space to stand below the previous solar panel while installing the next solar panel.

After all the solar panels in the first column are installed, the ladders can then be removed, and reassembled in the same configuration on the next column over, allowing the process to be repeated for subsequent columns until all panels are installed. The same process can be used in reverse for quickly and safely removing all of the panels for disassembly.

In some embodiments, multiple solar panels are connected together in a string and wire leads from these solar panels can be secured to a solar panel frame with standard metal wire management clips. These wire leads strings can then be connected to the container's internal electrical system via external MC4 connectors on the DC junction Box. The string can be configured in a symmetric manner centered on the east and west sides of the array. This can allow for the most consistent solar exposure for each string, and can limit clipping of solar panels due to shading.

Every microgrid module can have a point of connection for customer loads. A hole on the northwest top corner of the container or elsewhere can either be connected to a weather head for overhead connection or to a conduit for trenched lines. Wire leads can be pre-wired to electrical protection devices for splice connection to the customer load connections. Modular microgrid AC battery systems can have wire leads for connecting existing generators to the system. Leads can be pre-wired and can require splicing in a junction box to customer lines. All microgrid modules can ship pre-programmed for the final destination operation, or re-programmed via remote control access.

Figure 22:
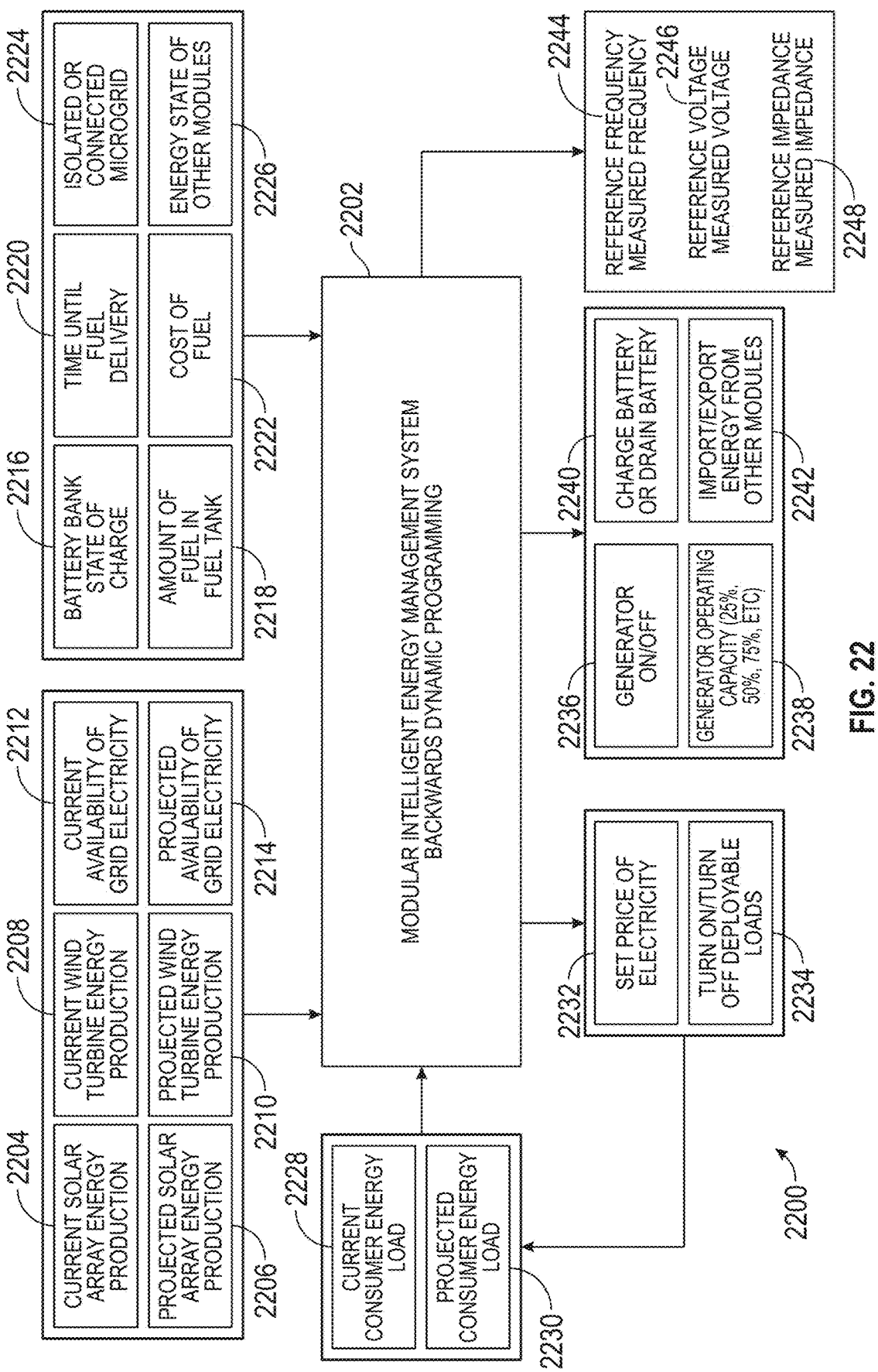
FIG. 22 illustrates a modular intelligent energy management system (MIEMS) decision flowchart according to examples of the disclosure.

FIG. 22 illustrates a modular intelligent energy management decision flowchart according to examples of the disclosure. In some embodiments, a microgrid may be associated with a Modular Intelligent Energy Management System (hereinafter MIEMS) 2400 which is a decentralized energy monitoring and management system that can utilize backwards dynamic programing, predictive forecasting, and machine learning to optimize the generation, storage, and distribution of electrical energy. The flowchart 2200 depicts the input data and decision variables managed by the MIEMS 2202 according to examples of the disclosure. The input data may comprise current solar array energy production 2204, projected solar array energy production 2206, current wind turbine energy production 2208, projected wind turbine energy production 2210, current availability of grid electricity 2212, projected availability of grid electricity 2214, battery bank state of charge 2216, amount of fuel in fuel tank 2218, time until fuel delivery 2220, cost of fuel 2222, isolated or connected micro grid 2224, energy state of other modules 2226, current consumer energy load 2228, projected consumer energy load 2230. The MIEMS 2202 can make resource allocation decisions within discretized time intervals using Approximate Dynamic Programming (ADP) techniques. The decisions made by the MIEMS 2202 may comprise setting price of electricity 2232, turning deployable loads off and on 2234, turning generator on and off 2236, setting generator operating capacity 2238, charging or draining battery 2240, importing or exporting energy from other modules 2242. The MIEMS 2202 may also output reference and measured frequency 2244, reference and measured voltage 2246, reference and measured impedance 2248. ADP can consider a subset of the state space, which can include current levels and future forecasts of solar and wind availability, load, etc. in order to make these decisions.

The MIEMS 2202 can provide complete monitoring and control capabilities at multiple discrete levels. At the level of an individual microgrid module, the MIEMS 2202 can provide remote monitoring and control of the module, including the state of charge, current energy production, current energy consumption, projected consumption, and projected generation. Based upon this data, the MIEMS can allow for optimization of energy generation and storage from a battery bank and a combustion generator to maximize system efficiency and power factor, as well as controlling any deployable loads connected to the MIEMS 2202.

At the next level, the MIEMS 2202 can enable interaction and optimization within multiple microgrid modules and other energy sources. In some embodiments, MIEMS 2202 can facilitate the transfer of energy between multiple microgrid modules and other energy generation assets such as combustion-generators or a centralized electrical grid. The input data to MIEMS 2202 can include but is not limited to, the state of charge of each microgrid module, the current and projected loads for each microgrid module, and the availability of renewable and other energy sources at each site, frequency, voltage and impedance measured at each microgrid module. Output data from MIEMS can include but is not limited to, future state of charge, optimized electrical pricing, fuel requirements, reference frequency, reference voltage, reference impedance.

Figure 23:
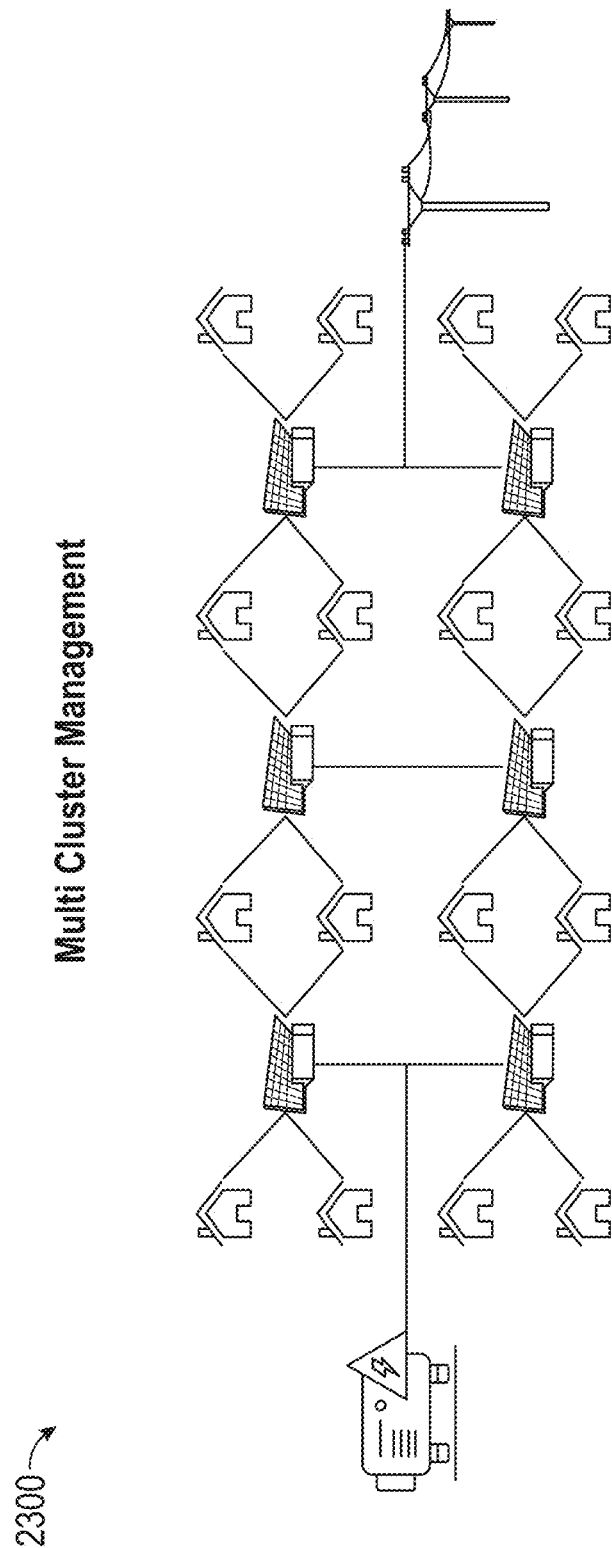
FIG. 23 illustrates a symbolic representation of multi-cluster management using MIEMS according to examples of the disclosure.

FIG. 23 illustrates a symbolic representation of multi-cluster management using MIEMS 2202 according to examples of the disclosure. In some embodiments, at the next macro level, MIEMS based multi-cluster management can extrapolate the capabilities of the energy management flow chart 2200 to a macro system 2300 that includes multiple interconnected modular microgrid systems, multiple points of variable consumption, as well as traditional generation resources or the electrical grid. This macro system 2300 can use an economic decision matrix to optimize the import and export of energy from other modular microgrids, as well as from outside generation sources such as combustion engines or traditional grid infrastructure. The MIEMS may perform several autonomous functions, which may include but are not limited to, deciding when and how much to use combustion engine energy or grid energy to supplement renewable resources to minimize cost and maximize efficiency, predictive forecasting of future energy production and demand, enabling generators in a cluster to charge the batteries to the exact level required to meet demand while maximizing the usage of renewable energy.

When multiple energy generation units are connected together to provide power to one or more points of electrical consumption, the MIEMS 2202 can balance electrical generation and consumption across multiple sources of generation and storage. For example, when multiple points of energy consumption cause one battery bank to be lower than the other interconnected systems, energy can be diverted from systems with higher state of charges to complement the generation of the system providing the highest load.

Figure 24:
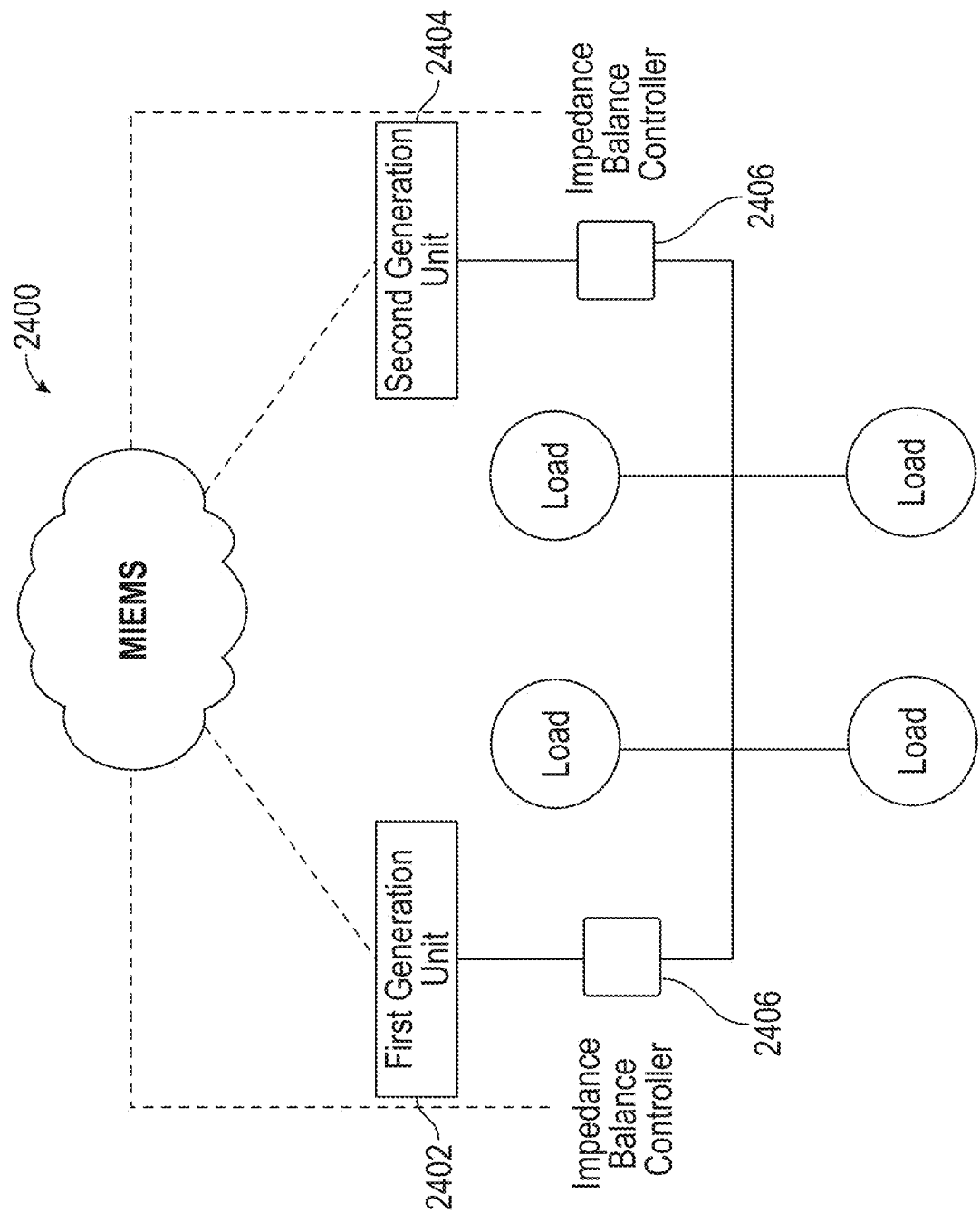
FIG. 24 illustrates an overview of the MIEMS control circuitry according to examples of the disclosure.

FIG. 24 illustrates an overview of the MIEMS controller architecture according to examples of the disclosure. In some embodiments, the proprietary MIEMS controller architecture 2400 can enable the interconnection of two or more energy generation units connected to one or more loads distributed across one or more physical locations and interconnected by a power distribution system.

The controller architecture 2400 provides substantial benefits relative to the existing methods of microgrid interconnection. Current microgrid technology is limited in its ability to interconnect multiple energy generation units when the sizes of the energy generation units differ or when the energy generation units are distributed across one or more locations interconnected by an electrical distribution system of varying lengths and impedances. For example, when multiple energy generation units are interconnected their phase, frequency, and voltage must be synchronized in order to avoid voltage droop. This synchronization is typically accomplished by designating one energy generation as the grid forming unit and all other energy generation units as grid following units. The grid forming unit sets the phase, frequency, and voltage values which are ideally followed by the grid following units. However, interconnecting multiple energy generation units of varying sizes, manufacturers, and configurations, may result in small differences in the voltage, phase, or frequency produced by each energy generation unit which may cause widespread power quality and reliability issues.

In some embodiments, the MIEMS controller architecture 2400 can solve this problem by employing a power controller that uses the grid forming inverter in first generation unit 2402 to set the frequency and voltage for the entire microgrid system, and sending the reference values as signals to other generation units, for example to the second generation unit 2404, thus causing the voltage and frequency of the entire distributed energy network to be synchronized. Additionally, several environmental factors such as changes in the ambient temperature could cause the voltage and frequency to fluctuate across the distribution system. The MIEMS controller architecture 2400 can also comprise voltage and frequency regulation circuits which constantly calculate deviations and restore the original values. This is done by measuring variations in the grid voltage, frequency, and phase at each generation unit, and calculating correction parameters to account for voltage droop, phase imbalance, and frequency shifts.

The second limitation of existing microgrid technology arises due to impedance imbalance. The impedance value at a load is effected by the magnitude of the load and the distance between the load and the energy generation unit. When generation units are distributed across one or more locations interconnected by an electrical distribution system, the impedance in the wires may vary, resulting in an unequal distribution of load sharing between the energy generation units. Unequal impedances at different energy generation units result in unequal amounts of power being drawn from each generation units. Hence, even though the energy generation units are within the same network, one of them can be completely drained, resulting in a total system failure.

In some embodiments, the MIEMS controller architecture 2400 can solve the impedance imbalance problem by actively measuring the impedance at each energy generation unit, and adjusting it using an impedance balance controller 2406 to intelligently balance the power provided from each generation unit. Therefore, by measuring and adjusting the impedance at each generation unit, the MIEMS controller architecture 2400 accounts for power inconsistencies caused by the configuration of the distribution network, as well as other environmental factors, resulting in a more stable microgrid system.

Figure 25:
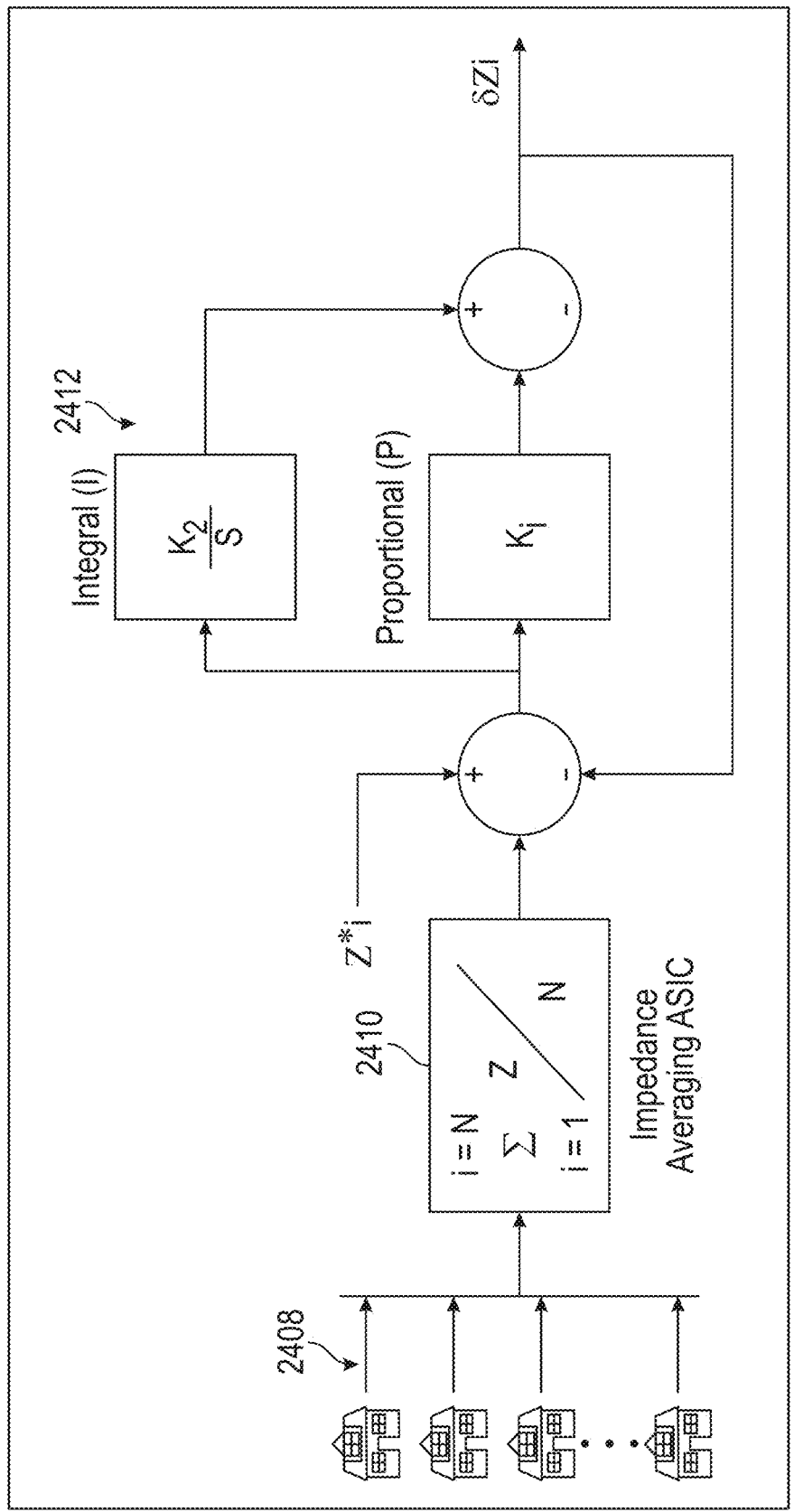
FIG. 25 illustrates an impedance balance controller according to examples of the disclosure.

FIG. 25 illustrates an impedance balance controller according to examples of the disclosure. In some embodiments, the impedance balance controller 2406 utilized by the MIEMS controller architecture 2400 considers load voltage regulation as opposed to just voltage regulation at inverter terminals, which is the conventional method utilized by microgrid controllers. The load impedances 2408 are fed into an application-specific integrated circuit 2410 configured to average out the impedances, the average impedance is then fed into a proportional integral (PI) controller 2412 as a reference. The PI controller 2412 compares the impedance of each individual load to this reference and regulates it before it is passed unto the power controller, ensuring that each generation unit is supplying an optimal level of power to the loads, increasing the overall system efficiency and stability.

Figure 26:
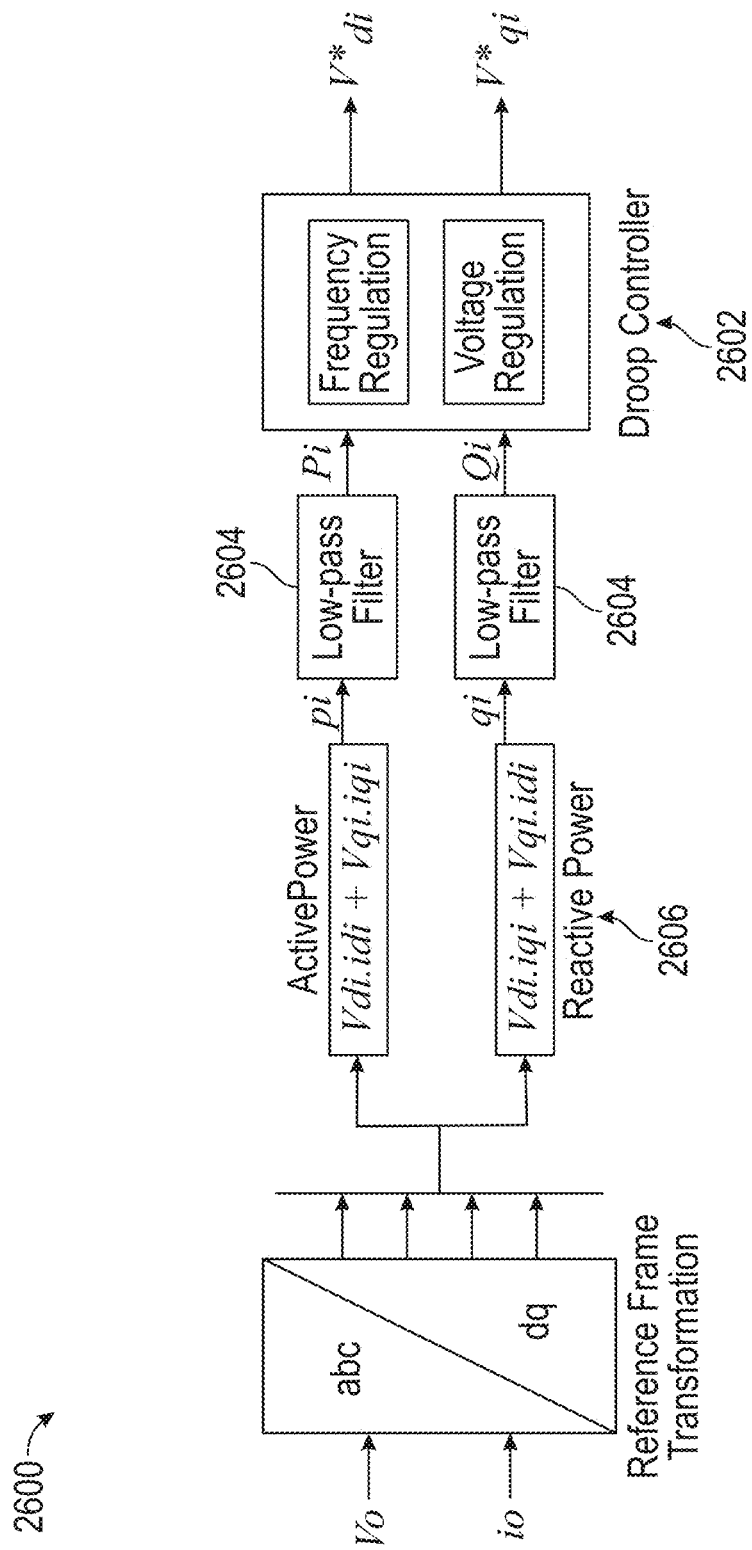
FIG. 26 illustrates a power controller according to examples of the disclosure.

FIG. 26 illustrates a power controller according to examples of the disclosure. In some embodiments, the MIEMS controller architecture 2400 can include a power controller 2600. The power controller 2600 transforms the three-phase voltage and current inputs into the d-q reference frame using park transformation to simplify the control circuit. The power controller 2600 can measure the active and reactive power of an energy generation unit and use a conventional droop controller 2602 to balance the active and reactive power and obtain a reference voltage and frequency, which can both be regulated and kept within steady margins. Since, high frequency noise signals can distort signals within the controller, low pass filters 2604 between the power calculation block 2606 and the droop controller 2602 can be used to filter out any noise in the circuit. The power controller can calculate the active and reactive powers of the inverter and send them to the droop controller 2602 via low pass filters 2604. The droop controller 2602 can set the frequency and voltage references, and send them to current controllers (not depicted) and voltage controllers (not depicted) where minor variations in the voltage and frequency can be corrected. The power, voltage and current controllers can adjust the output frequency and voltage of the inverters connected to a primary DC source in an energy unit. "Vdi" and "Vqi" represent the nominal voltage of an ith energy generation unit in the d-q reference frame. Similarly, "Idi" and "Iqi" represent the nominal current of the ith generation unit in the d-q reference frame.

Figure 27:
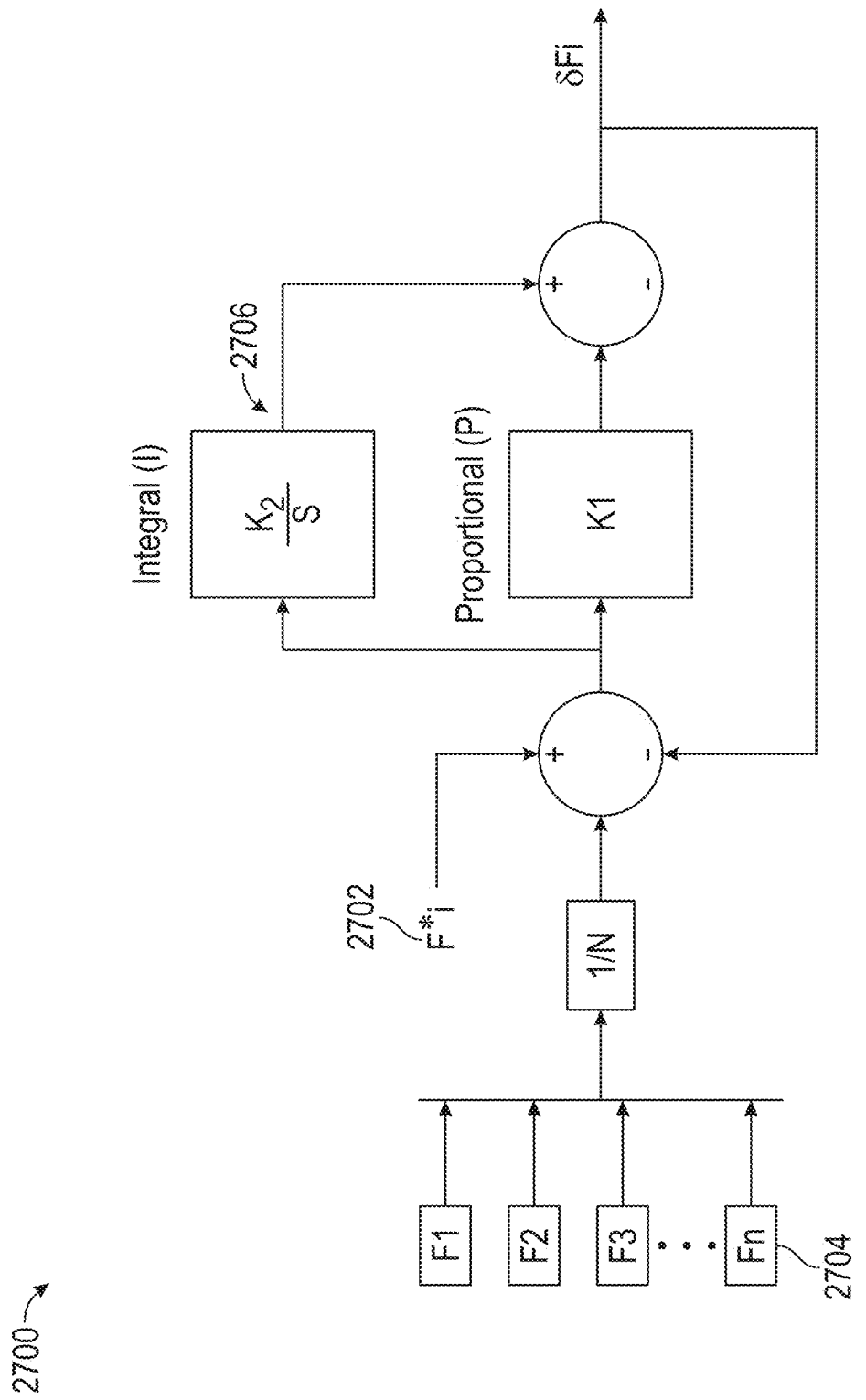
FIG. 27 illustrates a frequency regulator according to examples of the disclosure.

FIG. 27 illustrates frequency regulation circuitry according to examples of the disclosure. In some embodiments, the MIEMS controller architecture 2400 can include a frequency regulator 2700, which is based on control theory principles. Control theory deals with the behavior of dynamic systems ensuring that the systems produce a desired output called the reference value. In frequency regulator 2700 F*i 2702 is the reference system frequency set by a grid-forming inverter and Fn 2704 is the frequency sensed at the node of the ith energy generation unit. The frequency regulator 2700 employs a proportional integral control system 2706 to ensure that the set reference value is controlled within preset limits by tuning the Kp and Ki parameters, where Kp is the proportional gain and the Ki is the integral gain for the PI controller. Increasing Kp decreases the steady state error but could increase the initial overshoot that happens before the system settles down to the reference value. Increasing Ki increases the amount of time it takes for the signal to settle but decreases the rise time, enabling the output value to get closer to the set reference faster. Kp and Ki can be modified for frequency regulation.

Figure 28:
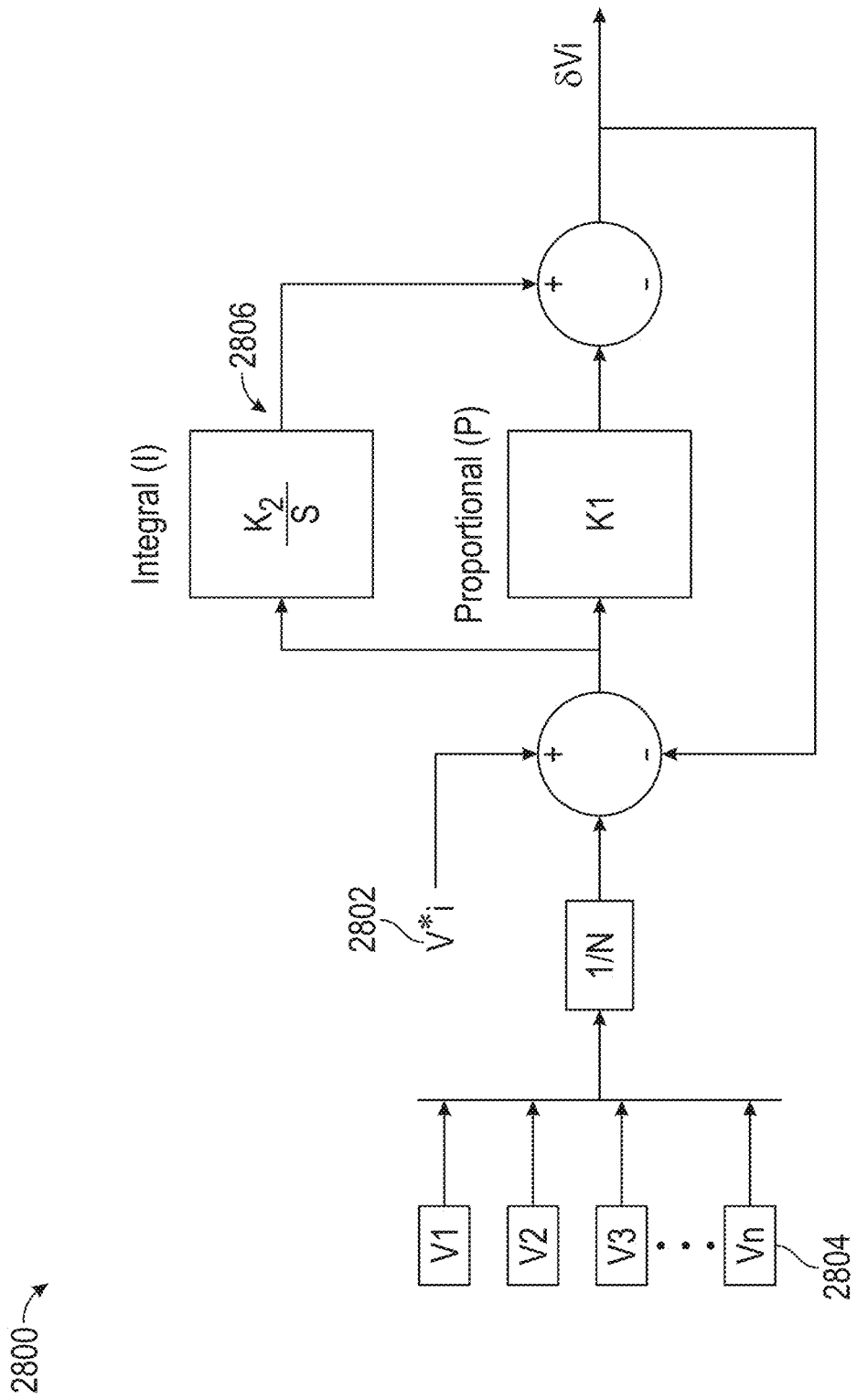
FIG. 28 illustrates a voltage regulator according to examples of the disclosure.

FIG. 28 illustrates voltage regulation circuitry according to examples of the disclosure. In some embodiments, the MIEMS controller architecture 2400 can include a voltage regulator 2800, which can be implemented similarly to the frequency regulator 2700 described above.

In addition to the previous capabilities described, the MIEMS can enable various functionalities, both at the individual micro grid unit level, and at the aggregated multi-unit level. MIEMS can enable the generation of forecast information to make decisions about the import and export of energy based upon economic factors such as current pricing, future pricing, current demand and future demand, as well as environmental factors such as weather and outage events. One example of this operation involves purchasing energy during low-rate hours to fill the battery banks, and then exporting the energy during high-rate hours to generate increased savings or revenue. The MIEMS can also control deployable loads (defined as loads that can be strategically scheduled for a variety of purposes including efficiency and profitability), such as water pumps, water heaters, air conditioning units, or any other electrical appliance that do not require continual electrical power. This can be done to accomplish one or more of the following: peak shifting, utilization of excess power, reduction of power consumption, and strategic scheduling to minimize peak loading. Finally, all modular microgrid units can communicate with and respond to utility Supervisory Control and Data Acquisition (SCADA) controls for the purpose of providing utility operators with a distributed fleet of generation and storage assets that are capable of aggregation into a virtual power plant or utility-scale battery. Utility operators can utilize this feature for one or more of the following functions: meeting peak loads with renewable resources, avoiding costly and polluting diesel or gas turbines, storing excess renewable energy for later utilization, and increasing grid resiliency.

Although the disclosed examples have been fully described with reference to the accompanying drawings, it is to be noted that various changes and modifications will become apparent to those skilled in the art. Such changes and modifications are to be understood as being included within the scope of the disclosed examples as defined by the appended claims.

The invention claimed is:

1. A modular microgrid, comprising:
two or more energy storage systems, each energy storage system of the two or more energy storage systems comprising:
one or more sources of renewable energy generation,
one or more batteries coupled to the one or more sources of renewable energy generation, and
one or more sources of nonrenewable energy generation;
a local distribution network configured to be in communication with the two or more energy storage systems and one or more loads, the local distribution network configured to transmit electrical energy between the two or more energy storage systems and further transmit electrical energy between the two or more energy storage systems and the one or more loads; and
a microgrid control system in communication with the local distribution network, the microgrid control system configured to determine generation, distribution, and consumption of the electrical energy within the local distribution network, the microgrid control system comprising an impedance balance controller and a power controller,
wherein the impedance balance controller is configured to:
receive one or more load impedances, a load impedance corresponding to a respective load of the one or more loads;
determine, at an application integrated circuit, an average impedance based on the one or more load impedances;
determine, at a proportional integral controller, one or more balanced load impedances based on the average impedance and the one or more load impedances; and
send the one or more balanced load impedances to the power controller.

2. The modular microgrid of claim 1, wherein at least one of the two or more energy storage systems is part of a single integrated module, the single integrated module configured for operating independently or in conjunction with other single integrated modules.

3. The modular microgrid of claim 2, wherein the single integrated module comprises:
a container configured to house at least one of the two or more energy storage systems;
a sub-structure attached to the container; and
a solar rail assembly attached to the sub-structure, wherein
the solar rail assembly is configured to support one or more solar panels.

4. The modular microgrid of claim 3, wherein the container is a Container Express (CONEX) container or a custom container.

5. The modular microgrid of claim 3, wherein the sub-structure comprises a plurality of pipes and a plurality of braces interconnected to support the solar rail assembly.

6. The modular microgrid of claim 5, wherein:
the plurality of pipes are round; and
the plurality of braces are square.

7. The modular microgrid of claim 3, further comprising a plurality of brackets, wherein the sub-structure is attached to corners of the container using one or more of the plurality of brackets.

8. The modular microgrid of claim 3, further comprising a plurality of anchoring brackets, wherein the container is attached to a surface using one or more of the plurality of anchoring brackets.

9. The modular microgrid in claim 1, wherein the microgrid control system is configured to optimize the electrical energy based on input variables comprising energy availability from the two or more energy systems and further from projected energy requirements at the one or more loads.

10. The modular microgrid in claim 1, wherein the power controller is configured to:
determine, for a first energy storage system of the two or more energy storage systems, at least one of a first voltage, a first phase, and a first frequency;
send, to a second energy storage system of the two or more energy storage systems, one or more reference values corresponding to the at least one of the first voltage, the first phase, and the first frequency; and
synchronize at least one of a second voltage, a second phase, and a second frequency of the second energy storage system to match the at least one of the first voltage, first phase, and first frequency.

11. The modular microgrid in claim 1, wherein the one or more balanced load impedances is received by an inverter of the power controller.

12. The modular microgrid in claim 1, wherein the local distribution network is further configured to be in communication with a conventional electric grid.

13. The modular microgrid in claim 1, wherein determining the generation, the distribution, and the consumption of energy comprises, for a first energy storage system and a second energy storage system of the two or more energy storage systems:
receiving energy levels associated with a first battery of the first energy storage system and a second battery of the second energy storage system;
receiving renewable energy production levels associated with a first source of renewable energy of the first energy storage system and a second source of renewable energy generation of the second energy storage system;
receiving projected renewable energy production levels associated with the first source of renewable energy of the first energy storage system and the second source of renewable energy generation of the second energy storage system;
receiving nonrenewable energy production levels associated with a first source of nonrenewable energy of the first energy storage system and a second source of nonrenewable energy generation of the second energy storage system;
receiving projected nonrenewable energy production levels associated with the first source of nonrenewable energy of the first energy storage system and the second source of nonrenewable energy generation of the second energy storage system;
receiving a load level associated with a first load of the one or more loads;
receiving a projected load associated with the first load; and
basing the generation, the distribution, and the consumption of the electrical energy within the local distribution network on the energy levels, the renewable energy production levels, the projected renewable energy production levels, the nonrenewable energy production levels, the projected nonrenewable energy production levels, the load level, and the projected load.

14. The modular microgrid in claim 1, wherein the microgrid control system is configured to import electrical energy from a first energy storage system of the two or more energy storage systems to a second energy storage system of the two or more energy storage systems.

15. The modular microgrid in claim 14, wherein an energy level of a first battery of the first energy storage system is higher than an energy level of a second battery of the second energy storage system.

16. The modular microgrid in claim 15, wherein a load of the first battery is lower than a load of the second battery.

17. The modular microgrid in claim 1, wherein the microgrid control system is configured to modify operation of a first source of nonrenewable energy of the one or more sources of nonrenewable energy associated with a first energy storage system of the two or more energy storage systems.

18. A modular microgrid, comprising:
two or more energy storage systems, each energy storage system of the two or more energy storage systems comprising:
one or more sources of renewable energy generation,
one or more batteries coupled to the one or more sources of renewable energy generation, and
one or more sources of nonrenewable energy generation;
a local distribution network configured to be in communication with the two or more energy storage systems and one or more loads, the local distribution network configured to transmit electrical energy between the two or more energy storage systems and further transmit electrical energy between the two or more energy storage systems and the one or more loads; and
a microgrid control system in communication with the local distribution network, the microgrid control system configured to determine generation, distribution, and consumption of the electrical energy within the local distribution network, the microgrid control system comprising a power controller,
wherein the power controller is configured to:
determine, for a first energy storage system of the two or more energy storage systems, at least one of a first voltage, a first phase, and a first frequency;

send, to a second energy storage system of the two or more energy storage systems, one or more reference values corresponding to the at least one of the first voltage, the first phase, and the first frequency; and synchronize at least one of a second voltage, a second phase, and a second frequency of the second energy storage system to match the at least one of the first voltage, first phase, and first frequency.

19. The modular microgrid of claim 18, wherein at least one of the two or more energy storage systems is part of a single integrated module, the single integrated module configured for operating independently or in conjunction with other single integrated modules.

20. The modular microgrid of claim 19, wherein the single integrated module comprises:
a container configured to house at least one of the two or more energy storage systems;
a sub-structure attached to the container; and
a solar rail assembly attached to the sub-structure, wherein
the solar rail assembly is configured to support one or more solar panels.

21. The modular microgrid of claim 20, wherein the container is a Container Express (CONEX) container or a custom container.

22. The modular microgrid of claim 20, wherein the sub-structure comprises a plurality of pipes and a plurality of braces interconnected to support the solar rail assembly.

23. The modular microgrid of claim 22, wherein:
the plurality of pipes are round; and
the plurality of braces are square.

24. The modular microgrid of claim 20, further comprising a plurality of brackets, wherein the sub-structure is attached to corners of the container using one or more of the plurality of brackets.

25. The modular microgrid of claim 20, further comprising a plurality of anchoring brackets, wherein the container is attached to a surface using one or more of the plurality of anchoring brackets.

26. The modular microgrid in claim 18, wherein the microgrid control system is configured to optimize the electrical energy based on input variables comprising energy availability from the two or more energy systems and further from projected energy requirements at the one or more loads.

27. The modular microgrid in claim 18, wherein the microgrid control system comprises: an impedance balance controller configured to balance the one or more energy loads associated with the local distribution network.

28. The modular microgrid in claim 27, wherein the impedance balance controller is configured to:
receive, one or more load impedances, a load impedance corresponding to a respective load of the one or more loads;
determine, at an application integrated circuit, an average impedance based on the one or more load impedances;
determine, at a proportional integral controller, one or more balanced load impedances based on the average impedance and the one or more load impedances; and
send the one or more balanced load impedances to the power controller.

29. The modular microgrid in claim 28, wherein the one or more balanced load impedances is received by an inverter of the power controller.

30. The modular microgrid in claim 18, wherein the local distribution network is further configured to be in communication with a conventional electric grid.

31. The modular microgrid in claim 18, wherein determining the generation, the distribution, and the consumption of energy comprises, for the first energy storage system and the second energy storage system of the two or more energy storage systems:
receiving energy levels associated with a first battery of the first energy storage system and a second battery of the second energy storage system;
receiving renewable energy production levels associated with a first source of renewable energy of the first energy storage system and a second source of renewable energy generation of the second energy storage system;
receiving projected renewable energy production levels associated with the first source of renewable energy of the first energy storage system and the second source of renewable energy generation of the second energy storage system;
receiving nonrenewable energy production levels associated with a first source of nonrenewable energy of the first energy storage system and a second source of nonrenewable energy generation of the second energy storage system;
receiving projected nonrenewable energy production levels associated with the first source of nonrenewable energy of the first energy storage system and the second source of nonrenewable energy generation of the second energy storage system;
receiving a load level associated with a first load of the one or more loads;
receiving a projected load associated with the first load; and
basing the generation, the distribution, and the consumption of the electrical energy within the local distribution network on the energy levels, the renewable energy production levels, the projected renewable energy production levels, the nonrenewable energy production levels, the projected nonrenewable energy production levels, the load level, and the projected load.

32. The modular microgrid in claim 18, wherein the microgrid control system is configured to import electrical energy from a first energy storage system of the two or more energy storage systems to a second energy storage system of the two or more energy storage systems.

33. The modular microgrid in claim 32, wherein an energy level of a first battery of the first energy storage system is higher than an energy level of a second battery of the second energy storage system.

34. The modular microgrid in claim 33, wherein a load of the first battery is lower than a load of the second battery.

35. The modular microgrid in claim 18, wherein the microgrid control system is configured to modify operation of a first source of nonrenewable energy of the one or more sources of nonrenewable energy associated with a first energy storage system of the two or more energy storage systems.

36. A modular microgrid, comprising:
two or more energy storage systems, each energy storage system of the two or more energy storage systems comprising:
one or more sources of renewable energy generation,
one or more batteries coupled to the one or more sources of renewable energy generation, and
one or more sources of nonrenewable energy generation;
a local distribution network configured to be in communication with the two or more energy storage systems and one or more loads, the local distribution network configured to transmit electrical energy between the two or more energy storage systems and further transmit electrical energy between the two or more energy storage systems and the one or more loads; and a microgrid control system in communication with the local distribution network, the microgrid control system configured to determine generation, distribution, and consumption of the electrical energy within the local distribution network, wherein determining the generation, the distribution, and the consumption of energy comprises, for a first energy storage system and a second energy storage system of the two or more energy storage systems:

receiving energy levels associated with a first battery of the first energy storage system and a second battery of the second energy storage system;

receiving renewable energy production levels associated with a first source of renewable energy of the first energy storage system and a second source of renewable energy generation of the second energy storage system;

receiving projected renewable energy production levels associated with the first source of renewable energy of the first energy storage system and the second source of renewable energy generation of the second energy storage system;

receiving nonrenewable energy production levels associated with a first source of nonrenewable energy of the first energy storage system and a second source of nonrenewable energy generation of the second energy storage system;

receiving projected nonrenewable energy production levels associated with the first source of nonrenewable energy of the first energy storage system and the second source of nonrenewable energy generation of the second energy storage system;

receiving a load level associated with a first load of the one or more loads;

receiving a projected load associated with the first load; and basing the generation, the distribution, and the consumption of the electrical energy within the local distribution network on the energy levels, the renewable energy production levels, the projected renewable energy production levels, the nonrenewable energy production levels, the projected nonrenewable energy production levels, the load level, and the projected load.

37. The modular microgrid of claim 36, wherein at least one of the two or more energy storage systems is part of a single integrated module, the single integrated module configured for operating independently or in conjunction with other single integrated modules.

38. The modular microgrid of claim 37, wherein the single integrated module comprises:

a container configured to house at least one of the two or more energy storage systems;

a sub-structure attached to the container; and a solar rail assembly attached to the sub-structure, wherein the solar rail assembly is configured to support one or more solar panels.

39. The modular microgrid of claim 38, wherein the container is a Container Express (CONEX) container or a custom container.

40. The modular microgrid of claim 38, wherein the sub-structure comprises a plurality of pipes and a plurality of braces interconnected to support the solar rail assembly.

41. The modular microgrid of claim 40, wherein:
the plurality of pipes are round; and
the plurality of braces are square.

42. The modular microgrid of claim 38, further comprising a plurality of brackets, wherein the sub-structure is attached to corners of the container using one or more of the plurality of brackets.

43. The modular microgrid of claim 38, further comprising a plurality of anchoring brackets, wherein the container is attached to a surface using one or more of the plurality of anchoring brackets.

44. The modular microgrid in claim 36, wherein the microgrid control system is configured to optimize the electrical energy based on input variables comprising energy availability from the two or more energy systems and further from projected energy requirements at the one or more loads.

45. The modular microgrid in claim 36, wherein the microgrid control system comprises:

an impedance balance controller configured to balance the one or more energy loads associated with the local distribution network; and a power controller configured to maintain a network voltage and a network frequency associated with the local distribution network.

46. The modular microgrid in claim 45, wherein the impedance balance controller is configured to:

receive, one or more load impedances, a load impedance corresponding to a respective load of the one or more loads;

determine, at an application integrated circuit, an average impedance based on the one or more load impedances;

determine, at a proportional integral controller, one or more balanced load impedances based on the average impedance and the one or more load impedances; and send the one or more balanced load impedances to the power controller.

47. The modular microgrid in claim 46, wherein the power controller is configured to:

determine, for the first energy storage system of the two or more energy storage systems, at least one of a first voltage, a first phase, and a first frequency;

send, to the second energy storage system of the two or more energy storage systems, one or more reference values corresponding to the first voltage, the first phase, and the first frequency; and synchronize at least one of a second voltage, a second phase, and a second frequency of the second energy storage system to match the first voltage, first phase, and first frequency.

48. The modular microgrid in claim 47, wherein the one or more balanced load impedances is received by an inverter of the power controller.

49. The modular microgrid in claim 36, wherein the local distribution network is further configured to be in communication with a conventional electric grid.

50. The modular microgrid in claim 36, wherein the microgrid control system is configured to import electrical energy from a first energy storage system of the two or more energy storage systems to a second energy storage system of the two or more energy storage systems.

51. The modular microgrid in claim 50, wherein an energy level of a first battery of the first energy storage system is higher than an energy level of a second battery of the second energy storage system.

52. The modular microgrid in claim 51, wherein a load of the first battery is lower than a load of the second battery.

53. The modular microgrid in claim 36, wherein the microgrid control system is configured to modify operation of a first source of nonrenewable energy of the one or more sources of nonrenewable energy associated with a first energy storage system of the two or more energy storage systems.

* * * * *